United States Patent [19]

Wanninger et al.

[11] Patent Number: 4,937,439
[45] Date of Patent: Jun. 26, 1990

[54] METHOD AND SYSTEM FOR CREATING AND SCANNING A CUSTOMIZED SURVEY FORM

[75] Inventors: Lester A. Wanninger, Edina; John G. Fahnlander, Shakopee; Vernon F. Koch, Prior Lake; Thomas J. Duxbury, Golden Valley, all of Minn.

[73] Assignee: National Computer Systems, Inc., Eden Prairie, Minn.

[21] Appl. No.: 193,864

[22] Filed: May 13, 1988

[51] Int. Cl.⁵ .................. G06K 7/10; G06K 19/06; G06F 3/14; G09B 7/00
[52] U.S. Cl. ........................ 235/456; 235/487; 235/470; 235/494; 364/225.6; 364/237.83; 364/932.61; 364/932.62; 364/943; 364/920
[58] Field of Search ... 364/200, 900, 300, 200 MS File, 364/900 MS File; 400/76; 235/456, 487, 470, 494

[56] References Cited

U.S. PATENT DOCUMENTS

| | | | |
|---|---|---|---|
| 3,793,472 | 2/1974 | Sternberg et al. | 35/48 A |
| 3,872,462 | 3/1975 | Lemelson | 340/705 |
| 3,886,325 | 5/1975 | Dorr et al. | 235/429 |
| 3,896,295 | 7/1975 | Laplante | 235/487 |
| 3,900,961 | 8/1975 | Sokolski et al. | 434/363 |
| 4,027,142 | 5/1977 | Paup et al. | 235/379 |
| 4,322,754 | 3/1982 | Mason | 358/296 |
| 4,401,024 | 8/1983 | Frentness | 101/93.01 |
| 4,403,301 | 9/1983 | Fessel | 364/900 |
| 4,454,576 | 6/1984 | McInroy et al. | 364/200 |
| 4,481,603 | 11/1984 | McCaskill et al. | 364/900 |
| 4,534,288 | 8/1985 | Brovman | 101/211 |
| 4,538,059 | 8/1985 | Rudland | 235/468 |
| 4,542,378 | 9/1985 | Sugamuma et al. | 340/734 |
| 4,559,598 | 12/1985 | Goldwasser et al. | 364/419 |
| 4,599,798 | 7/1986 | Steele | 33/1 B |
| 4,751,674 | 6/1988 | Aoyagi et al. | 400/76 |
| 4,857,715 | 8/1989 | Koch et al. | 235/456 |

OTHER PUBLICATIONS

Form Documents for a Text Editing Application IBM Technical Disclosure Bulletin, vol. 26, No. 5, pp. 2490-2493, Oct. 1983.
Form Log and Printing IBM Technical Disclosure Bulletin, vol. 18, No. 11, p. 3552, Apr. 1976.

*Primary Examiner*—Gareth D. Shaw
*Assistant Examiner*—Gopal C. Ray
*Attorney, Agent, or Firm*—Dorsey & Whitney

[57] ABSTRACT

A desktop survey system for creating and scanning a survey form to be completed by a survey respondent, the survey form being printed on a scannable form having a preprinted timing track that can be scanned by an optical mark scanner is comprised of a processor for entering, editing, and formatting customized questions and corresponding response areas and for adjusting and aligning the locations of the questions and response areas to be printed on the scannable form, a printer for printing the customized questions and the corresponding response areas on the scannable form to create a customized survey form, and an optical mark scanner and attached processing means for defining the fields to be scanned, scanning the survey forms and tabulating and analyzing the results.

13 Claims, 30 Drawing Sheets

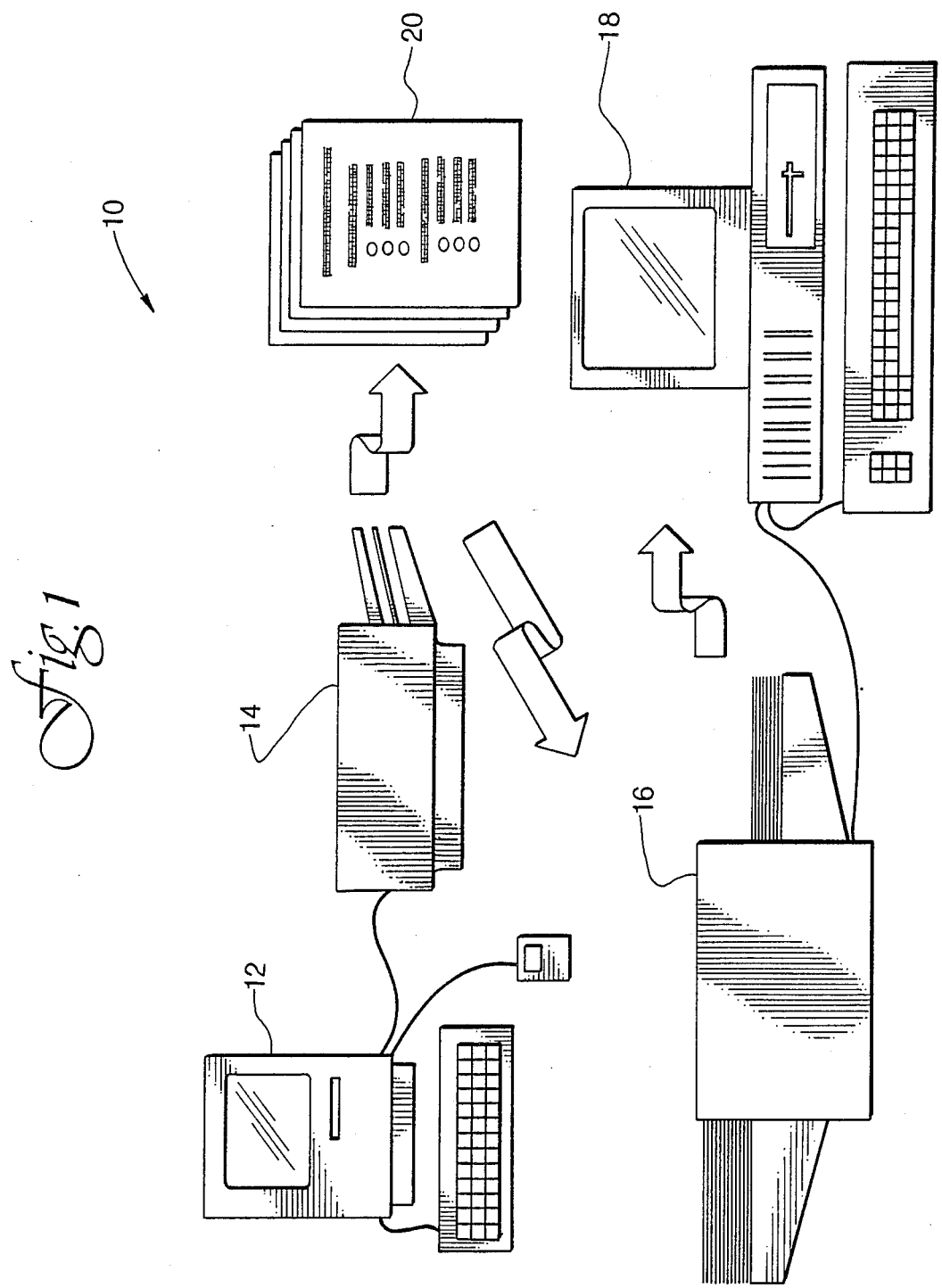

Fig. 2a

Toothpaste Survey

John Smith
Anystreet
Any apt
Any City, State, Zip
Any phone

Proper Mark
USE A NO. 2 PENCIL

1. How important is each of the following in the toothpaste you use?

|  | Extremely Important | Neither | Extremely unimportant |
   |---|---|---|---|
   | Prevents cavities | | | |
   | Whitens teeth | | | |
   | Freshens breath | | | |
   | Pleasant taste | | | |
   | Price | | | |

2. My favorite toothpaste helps me...

|  | Extremely good | Neither | Extremely bad |
   |---|---|---|---|
   | Prevent cavities | | | |
   | Whiten teeth | | | |
   | Freshen my breath | | | |
   | Has a pleasant taste | | | |

3. My favorite toothpaste is: _____

4. About how many times do you use toothpaste each day on average?
   - 0
   - 1
   - 2
   - 3
   - 4 or more 5. What form of toothpaste do you normally use?
   - Paste
   - Gel
   - Paste/gel combination
   - Don't know 6. What type of toothpaste do you normally use?
   - Fluoride
   - Non-fluoride
   - Don't know 7. Who decides which brands you use?
   - Yourself
   - Spouse
   - Parent
   - Other 8. Where do you most often purchase toothpaste?
   - Drug store
   - Supermarket
   - Discount store
   - Other 9. What is the most important reason you usually purchase your favorite toothpaste?
   - Prevents cavities
   - Whitens teeth
   - Freshens breath
   - Pleasant taste
   - Price
   - Form - paste or gel
   - Type - fluoride or not
   - Tube or can
   - Other

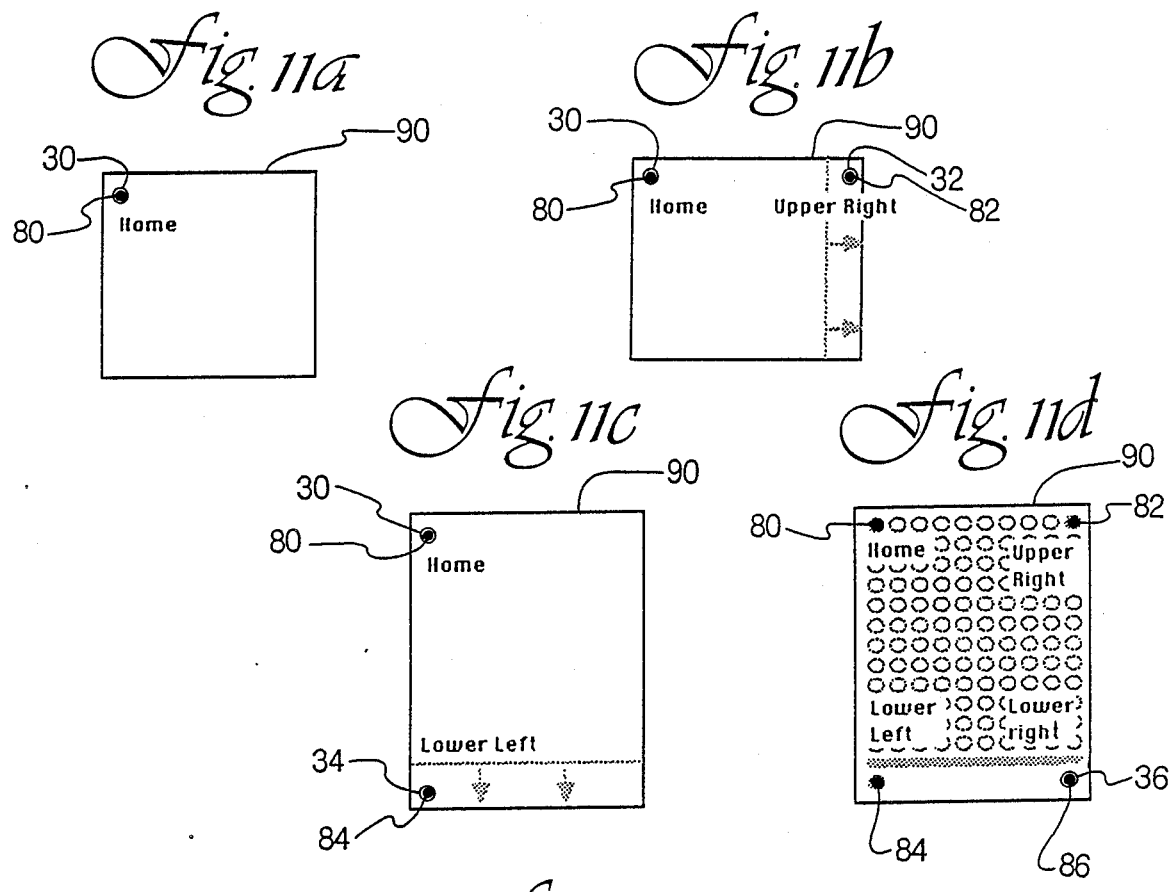
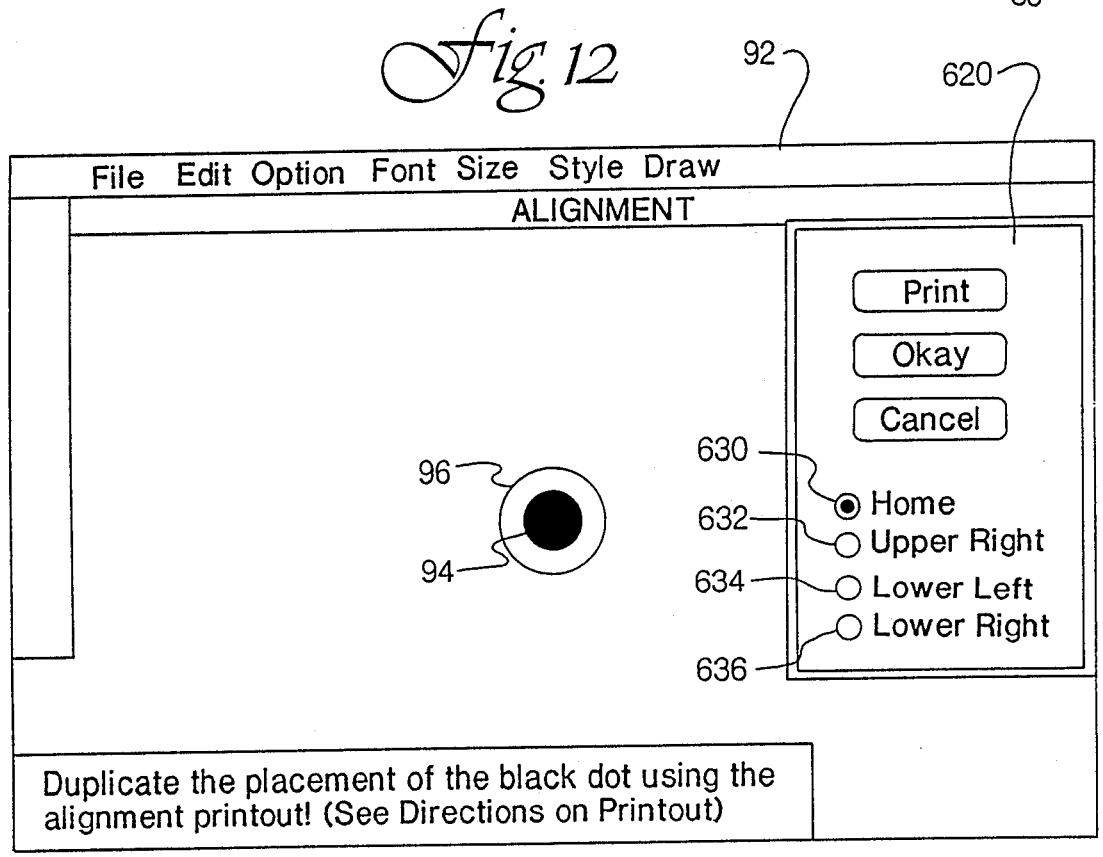

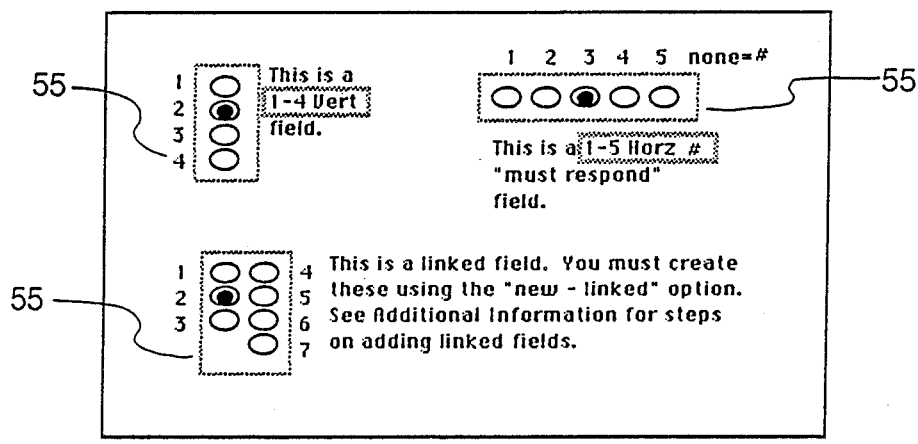

Fig. 22

```
╔══ Scanning Parameters ══╗
║ Data file        :[      ].DAT ║
║ Enter Batch #    :            ║
║ Enter Serial #   :            ║
║ Enter Constant   :            ║
║ Stop on Field Error: No ──── 1220
║ Stop on QR Error  : No  ──── 1222
║ Transport Printer : No  ──── 1224
║ Print Scan Report : No  ──── 1226
╚═══════════════════════════╝
```

Fig. 23

```
Scanner datafile Name: XXXXXXXX.DAT  Questionnaire Name:  XXXXXXXX.FFT

Last Recorded : Questionnaire 2     Press F10 to return to Main Menu
                Looking for page 2 or Questionnaire 3

1         2         3         4         5         6         7
1234567890123456789012345678901234567890123456789012345678901234567890
Q 1101092887000100001   SCAN  212212212211#212212234432Q2321231A12N12B2
Q 1102092887000100001   SCAN  212123121412121423A#31242Q1*3212S312Y2314

Control Fields            Scanned Data

1250 ─── Unexpected Form.  Incorrect Form ID
Please correct the errors listed above, and rescan entire questionnaire
Press any key to continue
```

Fig. 24a

23. Do you like your new car?
○ Yes
● No  If no, why?

"The seats are uncomfortable"

Do not write in this area

Fig. 24b

12. For whom do you usually buy this product? (open-ended)
○ Spouse
○ Mother or Father
○ Other family members
● Other  "friends"

12. other
    1 4 2 4 1
1 ●○○○●
2 ○●○○○
3 ○○○○○
4 ●○●○○
5 ○○○○○

46. other
1 ○○○○○
2 ○○○○○
3 ○○○○○
4 ○○○○○
5 ○○○○○

METHOD AND SYSTEM FOR CREATING AND SCANNING A CUSTOMIZED SURVEY FORM

TECHNICAL FIELD

The present invention relates generally to the field of optical mark scanning apparatus. More particularly, the present invention relates to a method and system for creating and scanning a customized survey form. This method and system has particular application in the creation of customized survey forms or questionnaires for use in conducting various types of market surveys and a wide variety of other data collection applications.

BACKGROUND ART

Optical mark reading (OMR) systems are well known in the prior art, and there are many applications for the use of OMR scannable in the large-scale gathering of information (e.g. student test scores, census information, consumer preference surveys or product survey forms). Typically, OMR systems have used a variety of preprinted scannable forms comprised of sheets of paper or other similar material that have a plurality of preprinted timing marks in a control mark column (often referred to as a timing track) and a plurality of response areas (often referred to as response bubbles) located on the sheet in a specified relationship with the timing marks. The timing marks are used to trigger the OMR system to scan or "read" the response area to detect whether a data mark is present at a particular response area.

OMR systems are well-suited for gathering information from a large number of documents containing data that can be stated numerically or categorically (i.e., multiple choice, yes or no). In a typical market survey application, a person would fill in the requested information on a scannable form by placing a data mark in the desired response areas. When completed, the scannable form is then fed into an OMR scanner that reads the data marks and transmits this data to a computer for editing, validation, and, ultimately, interpretation. While such OMR systems are an efficient means of gathering large amounts of information, it is generally not cost-effective to use current scannable forms with an OMR system to gather relatively small amounts of information (i.e. 5,000 surveys or less), particularly when the turn-around time for conducting a survey is limited or when a scannable form must be custom-designed for a survey.

The scannable forms for OMR systems of the type described above are either fixed format scannable forms having only response areas and no corresponding questions printed on the form (e.g., 50 true/false response areas), or custom scannable forms with specific questions (or other stimulus items, such as graphics) printed corresponding to each response area (e.g., a census survey). Fixed format scannable forms are inexpensive, but are limited in arrangement and require another document or a survey administrator to pose the questions, because fixed format scannable forms do not combine both the question and response area on a single document. Custom scannable forms are more flexible in their format, but are expensive and may require as many as 5,000 copies of the same form to be printed before the costs involved in designing and printing the forms by conventional offset printing methods are recovered. More importantly, the time required to print customized scannable forms by conventional offset printing methods is sometimes too long (requiring one to eight weeks from initial design to final printing), and does not meet the market needs of many potential OMR users, particularly when there is a shortened time requirement, as is often the case in market survey applications.

One of the difficulties in creating a customized scannable form for use in current OMR scanners is the low tolerance such scanners have for offset, misregistration, and poor print or paper quality. In particular, the timing tracks on scannable forms for such scanners must be printed to high standards of print quality and print alignment to insure that an acceptably high percentage of completed forms can later be properly scanned and scored. Current OMR scanners use the timing marks in the timing track to trigger when to scan the corresponding row of response areas in the response area. Consequently, if the response areas are not printed in relatively exact alignment with the corresponding timing mark, the OMR scanner may interpret the edge of a response area as a positive response or mark, rather than as a guide for the user filling in the data mark.

It would be desirable to allow an OMR user to custom design a survey form without the need to use conventional offset printing and design methods and without the limitations imposed by a fixed format scannable form. One example of a fixed format OMR system that permits limited customization of scannable forms is shown in U.S. Pat. No. 3,886,325. In this system, a format control sheet is used to custom control the scoring of a fixed format scannable form. That is, the format control sheet to select and group certain pre-printed response areas to be scored according to a predetermined format. This system does not allow for the use of custom text or stimuli to be printed on the scannable form. Moreover, it provides for only minimal flexibility and requires the user to learn another "language" to program the format control sheet.

Another possible solution is to create a customized survey form using currently available laser printers with, for example, standard paint and draw software programs (e.g., MacDraw). In general, however, such systems cannot replicate the print quality and alignment for the timing tracks required by current OMR scanners. Even if a blank scannable form having only a preprinted timing track were used as the paper stock for a laser printer, there is no way of establishing accurate alignment between the preprinted timing track on such a form and the corresponding rows of response areas to be printed by the laser printer.

Presently, there is no single system for creating and scanning a customized survey form that effectively allows all of the information generated during the design of the survey form to be used in scanning the survey form. For example, if a change in a customized survey form is made that would require a different scanning of the information being collected, there is no means for distinguishing that change during the eventual scanning of the forms because the scanning system is separate and distinct from the system that created the survey form. Also, it would be advantageous to allow the user to directly transfer details about all of the possible information being collected so that when the survey forms are scanned, this information does not have to be reentered into the scanning system. Currently, scanning systems require that the horizontal and vertical locations of response areas to be scanned and the information about the type of fields being scanned be manually entered or keyed into the system before a new survey form can be scanned. This process is duplication of effort and allows for errors and inaccuracies to be entered into the scanning system that may result in inaccurate scoring of the information on the survey form.

Although the existing OMR scanners and scannable forms may be satisfactory for other uses and applications, because of the problems recited above they are not well-suited for quickly gathering and analyzing information from a relatively small sample population by means of a customized survey form. Accordingly, there is a continuing need for a method and system to allow for the timely and cost-effective creation of customized scannable forms or survey forms that will be consistently and correctly scanned by current OMR systems. Moreover, there would be many advantages to a method and system for creating and scanning a customized survey form that integrates both the creation and the scanning of a customized survey form into a single, unified process.

SUMMARY OF THE INVENTION

In accordance with the present invention, a desktop survey system is provided in which customized survey forms may be created and scanned in a single, unified process. Generally, such a system includes a preprinted scannable form having a plurality of timing marks; a processing means for entering, editing, and formatting customized questions and corresponding response areas and for adjusting and aligning the locations of the questions and response areas to be printed on the scannable form, a printer for printing the customized questions and the corresponding response areas on the scannable form in proper alignment with the timing track to create a customized survey form or "questionnaire", and an OMR scanner and attached processing means for receiving information identifying and defining the fields to be scanned, scanning the survey forms and tabulating and analyzing the results.

More specifically, the present invention relates to a desktop survey system for creating and scanning a survey form to be completed by a survey respondent, the survey form being printed on a scannable form having a preprinted timing track that can be scanned by an optical mark scanner. The system is comprised of a computer for entering data specifying the questions and corresponding response areas to be printed on the survey form, the response areas being an outline in which the survey respondent may make a data mark indicating that response area was selected by the survey respondent. The computer allows the user to position both the questions and response areas by moving images on a computer display that correspond to the questions and response areas. To insure that the response areas will be consistently and correctly scanned by the OMR scanner, the computer only allows the user to position the response areas about a series of predetermined locations or dots that make up a grid pattern that is aligned in a specified relation with the preprinted timing marks on the scannable form. The positions of all of the response areas are then communicated by means of either a form key or a data file to a computer that operates the OMR scanner. Each form key or data file specifies all of the selected positions for the response areas printed on the survey form and a unique form identification mark generated by the computer that controls the positioning of the response areas. The form key is printed on the scannable form with all of the selected positions for the response areas being filled in with marks that will be detected as data marks by the OMR scanner. The data file is read by the computer that operates the scanner and contains the same position information in a specified format. The computer that operates the scanner uses this position information when scanning the survey forms after they have been completed by the respondents to determine which response areas were selected by the survey respondents as indicated by the data marks within those response areas. Because any number of possible positions and combinations of response areas is possible with the present invention, the system provides for a unique form identification mark generated by the computer that controls the positioning of the response areas. This form identification mark is printed on each survey form or stored in each data file and verified when the survey forms are scanned to insure that the proper position information is being used to control the scanning of the survey form. The desktop survey system also provides for several other desirable features, including the ability to integrate or merge a data file containing individualized information with the survey forms, thereby producing individualized survey forms. A merge mark code is also printed on the survey form that allows the computer operating the scanner to relink the survey form with the appropriate record in the data file containing the individualized information after the survey form has been scanned.

Accordingly, a primary objective of the present invention is to provide a timely and costeffective method and system for creating and scanning a customized survey form.

Another objective of the present invention is to provide a method and system for creating and scanning a customized survey form that integrates both the creation and scanning of the customized survey form into a single unified process.

A further objective of the present invention is to provide a method and system for insuring that the response areas of a customized survey form will be printed in a specified relationship with the timing marks to insure that the survey forms will be consistently and correctly scanned by current OMR systems.

Another objective of the present invention is to provide a method and system for increasing the efficiency of such a system by only requiring the user to enter information relating to the position of the response areas on the survey form a single time.

These and other objectives of the present invention will become apparent with reference to the drawings, the detailed description of the preferred embodiment and the appended claims.

DESCRIPTION OF THE DRAWINGS

FIG. 1 is a pictorial view of the operative components of a preferred embodiment of a desktop survey system in accordance with the present invention.

FIG. 2a is a survey form produced by the desktop survey system of the present invention, including customized questions, response areas, and alignment marks, printed on a scannable form that is blank except for the bias bar and the timing track.

FIGS. 11a–11d are depictions of a scannable form during the steps that comprise the Alignment process of the present invention.

FIG. 12 is a depiction of a computer screen display for the Alignment process.

FIG. 19 is a depiction of three field types that may be defined for the response areas.

FIG. 20 is a depiction of a computer screen display for the Open-Ends window.

FIG. 22 is a depiction of a computer screen display for the Scan Parameters window.

FIG. 23 is a depiction of a computer screen display showing the results of the Scan process.

FIGS. 24a–24b are depictions of two alternative methods of coding open-ended questions.

DESCRIPTION OF THE PREFERRED EMBODIMENT

Figure 2B:
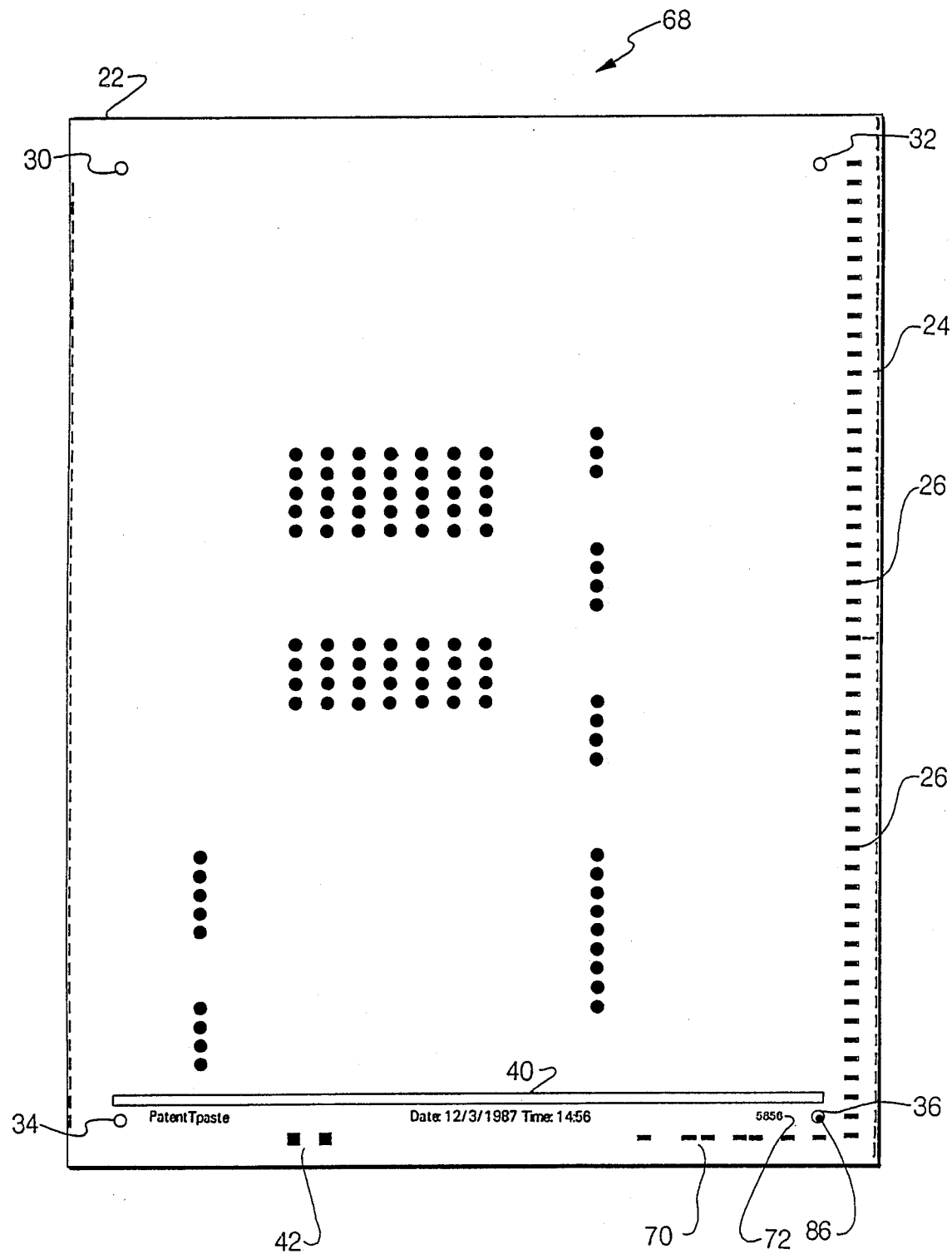
FIG. 2b is a form key produced by the desktop survey system of the present invention, including all of the response areas filled in and printed on a blank scannable form.

Referring to FIG. 1, the operative components of a desktop survey system 10 in accordance with the present invention will generally include, a computer 12 coupled with a laser printer 14 for creating the customized survey forms 20, and a scanner 16 coupled to a second computer 18 for scanning the survey forms 20 once the desired information has been collected. Briefly, the specifications for the survey forms 20 are created using the computer 12 and then overprinted on blank scannable forms 22 (FIG. 2a) by the laser printer 14. Once the survey forms 20 are printed, they may be fielded using any number of collection methods to collect the desired information. After the survey has been fielded or the test has been administered, the completed survey forms 20 are scanned using the scanner 16 coupled with the second computer 18. When the scanning process is finished, the scanned information may then be edited and verified, responses to open-ended questions may be encoded, and the resulting data is now ready for analysis and interpretation.

In a preferred embodiment of the present invention, the computer 12 is an Apple Macintosh SE available from Apple Computers, Inc., of Cuppertino, Calif. The laser printer 14 is an Omni Laser 2115 available from Texas Instruments, Inc., Dallas, Tex. The scanner 16 is a NCS Sentry 3000 available from National Computer Systems of Eden Prairie, Minnesota and the second computer 18 is an IBM PS/2 Model 30 available from International Business Machines, Armonk, N.Y. The scannable form 22 overprinted to make survey forms 20 is described in detail in co-pending application entitled OVERPRINT REGISTRATION SYSTEM FOR PRINTING A CUSTOMIZED SURVEY FORM AND SCANNABLE FORM THEREFOR, filed in the United States Patent and Trademark Office on Apr. 1, 1988 and identified by Ser. No. 176,610, which is fully incorporated by reference herein.

Although the preferred embodiment utilizes two computers, a laser printer and a scanner, it should be understood that the present invention may work equally well with a number of different component configurations. For instance, while the preferred embodiment uses a laser printer for printing the survey forms, any printer capable of the resolution and control achieved by a laser printer could accomplish the objectives of the present invention. In an alternative embodiment, the information about the design of the survey form might be conveyed to an offset printing press with a computer interface to allow larger quantities of a particular customized survey survey form to be produced, while still taking advantage of the time and design savings realized by the present invention. The present invention is equally applicable to forms scanned either by a Trans-Optic method of scanning (light transmitted through the form) or by a reflective-read method of scanning (light reflected from the surface of the form). Though a scanner with a relatively small duty cycle is used in the preferred embodiment, it should be realized that a scanner with a larger duty cycle or processing rate may be used depending upon the number of the survey forms being produced. In another embodiment, a single computer might be used for both the production and scanning of the survey forms, instead of two computers as shown in the preferred embodiment. Two computers are used in the preferred embodiment because it allow for the design and production and the scanning and analysis to be two separate operations that may occur simultaneously for different surveys, e.g. a census survey may be scanned and analyzed while a consumer preference survey is being designed and produced.

Referring now to FIG. 2a, a survey form 20 overprinted on a scannable form 22 in accordance with the present invention is shown. In a preferred embodiment, the scannable form 22 is comprised of a generally rectangular paper sheet having a timing track 24 consisting of a row of uniformly spaced preprinted timing marks 26 located along one edge of the sheet and a plurality of preprinted quality assurance marks 30, 32, 34 and 36 preprinted in a known, predetermined relationship with timing track 24. The scannable form 22 may also be preprinted with bias bar 40 and skunk marks 42. The bias bar 40 is used to adjust the intensity level of the scanner 16. The skunk marks 42 may be used to verify the proper type of scannable form or to signal the end of the scannable form. The information overprinted on the scannable form 22 to make the survey form 20 includes: the customized questions 52, the corresponding response areas 54 and any open-ended questions 56, text areas 57, graphics 58 or mail-merge locations 60 and mail merge control codes 62.

To overcome the problems and disadvantages inherent in the prior art OMR systems, the present invention coordinates the entire process into a single unitary method and system for creating and scanning survey forms. The desktop survey system 10 coordinates the two distinct processes that are required to use an OMR system: (1) the form production process and (2) the completed form analysis process. In the present invention, the production process includes the steps of designing the survey forms, printing the survey forms, and fielding or administering the survey. The analysis process includes the steps of defining the fields and assigning values to the response areas being scanned, coding any open-ended questions with predetermined key codes, scanning the survey forms, key-entering any written open-ended questions, cleaning up the data, and analyzing the data. The present invention overcomes the problems and deficiencies in the prior art by coordinating these two processes, thereby allowing the user to avoid unnecessary duplication of effort in creating and scanning the survey forms. In one embodiment, the present invention uses a form key 68 (FIG. 2b) for communicating the locations of all of the response areas 54 on the survey form 20 computer 12 to computer 18. In another embodiment, a form definition file containing the relative positions of all of the response areas 54 might be used to communicate this information between the two computers or between two different software programs running on the same computer. In addition, the coordination and unitary approach to designing and scanning survey forms allows the present invention to overcome other problems involved in the creation of a customized survey form that do not exist when a fixed format survey forms used. For example, a minor variation in the format of a response area may result in the scanning system needing to redefine the fields for that particular question. If the earlier version of the survey form is used by mistake, that particular question will be incorrectly scored. The present invention resolves this problem by providing the survey forms 20 with form identification marks 70 and sequence number marks 72 as will be described further below.

PRODUCTION PROCESS

Figure 3:
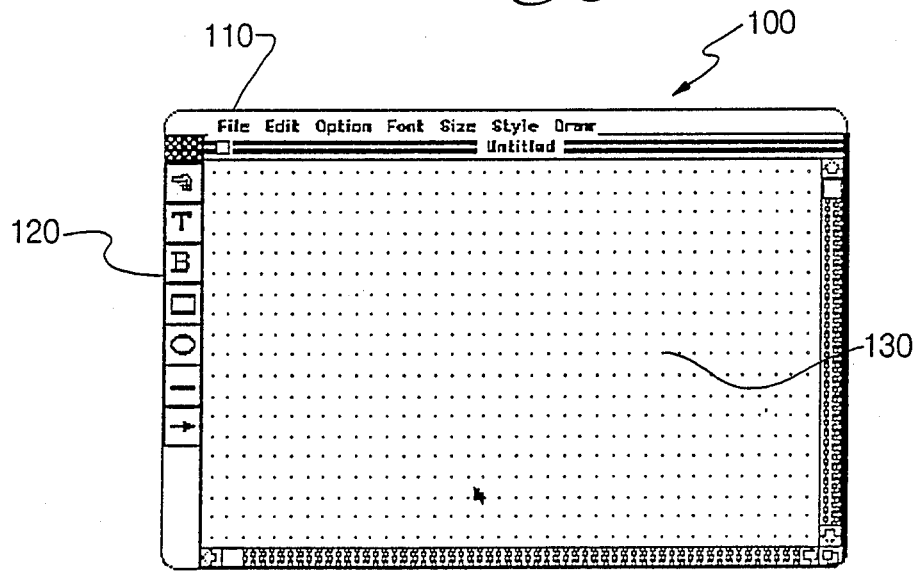
FIG. 3 is a depiction of a computer screen display showing the main screen for producing a customized survey form using the present invention.
Figure 4:
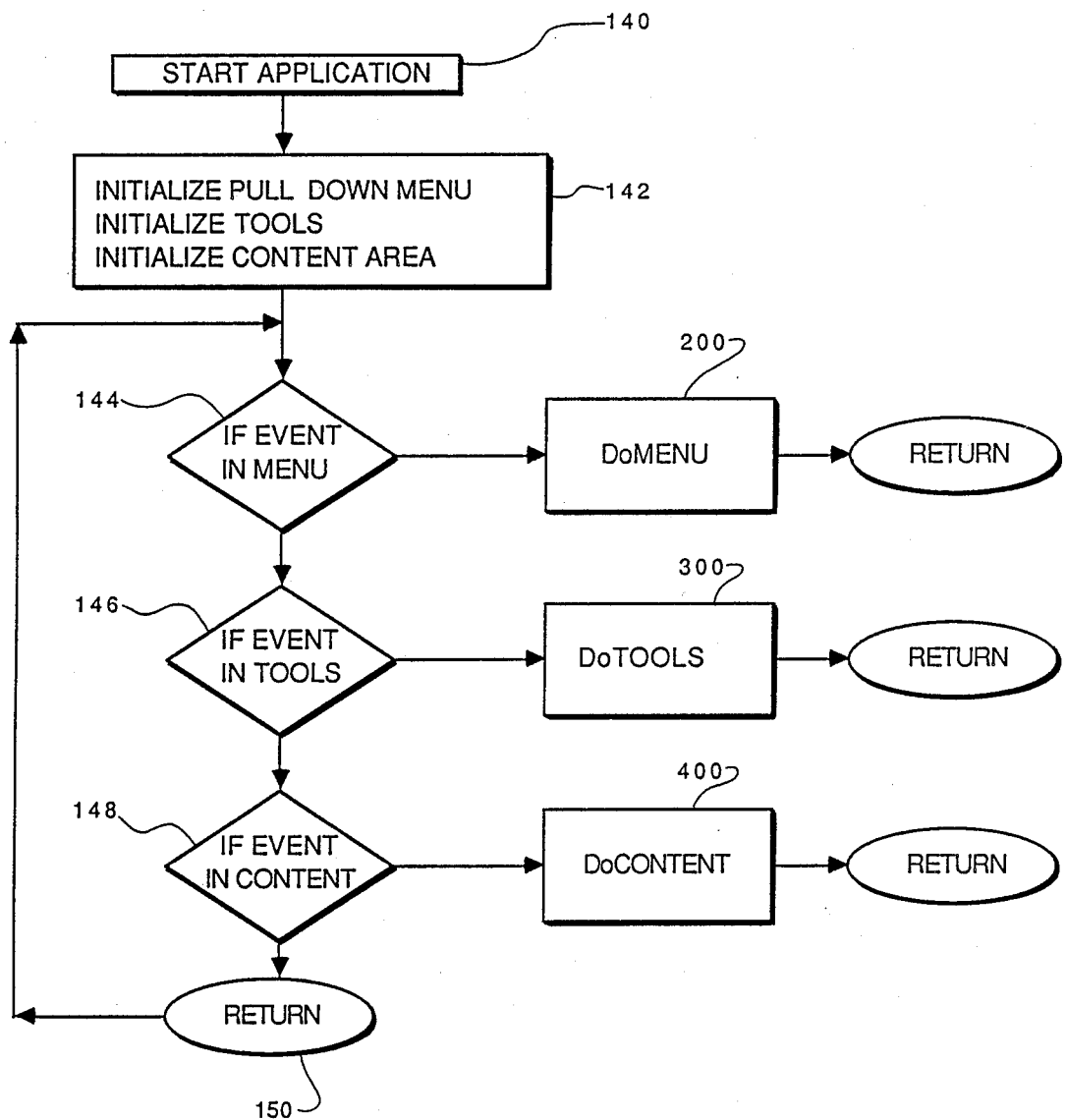
FIG. 4 is a flowchart of the software program associated with the computer display screen shown in FIG. 3.

With reference to FIG. 3, a main screen 100 for the software program that comprises the production process is shown. In the preferred embodiment, the production process software program is written for an Apple Macintosh computer and uses the pull-down screen and icon format compatible with that computer system. All of the actions or events that a user may select are accessed through the main screen 100 that is divided into Pull-Down Menu 110, Tools 120, and Content Area 130. The flowchart for the overall flow of the software program that drives the main screen 100 is shown in FIG. 4. At Start Application 140, the user has selected the desktop survey system application and the software program is loaded into the computer 12. At Initialize 142, initial values and default values are set or reset.

Now the program enters a polling loop waiting for directions from the user as to what actions or events are to be performed. At Event Menu 144, if the user has selected an event in Pull-Down Menu 110, the program transfers control to Do Menu 200. At Event Tools 146, if the user has selected an event in Tools 120, the program transfers control to Do Tools 300. At Event Content 148, if the user has selected an event in Content Area 130, the program transfers control to Do Content 400. After each of the Do routines (Do Menu 200, Do Tools 300 and Do Content 400), control is returned to the polling loop via Return 150.

Menu

Figure 5:
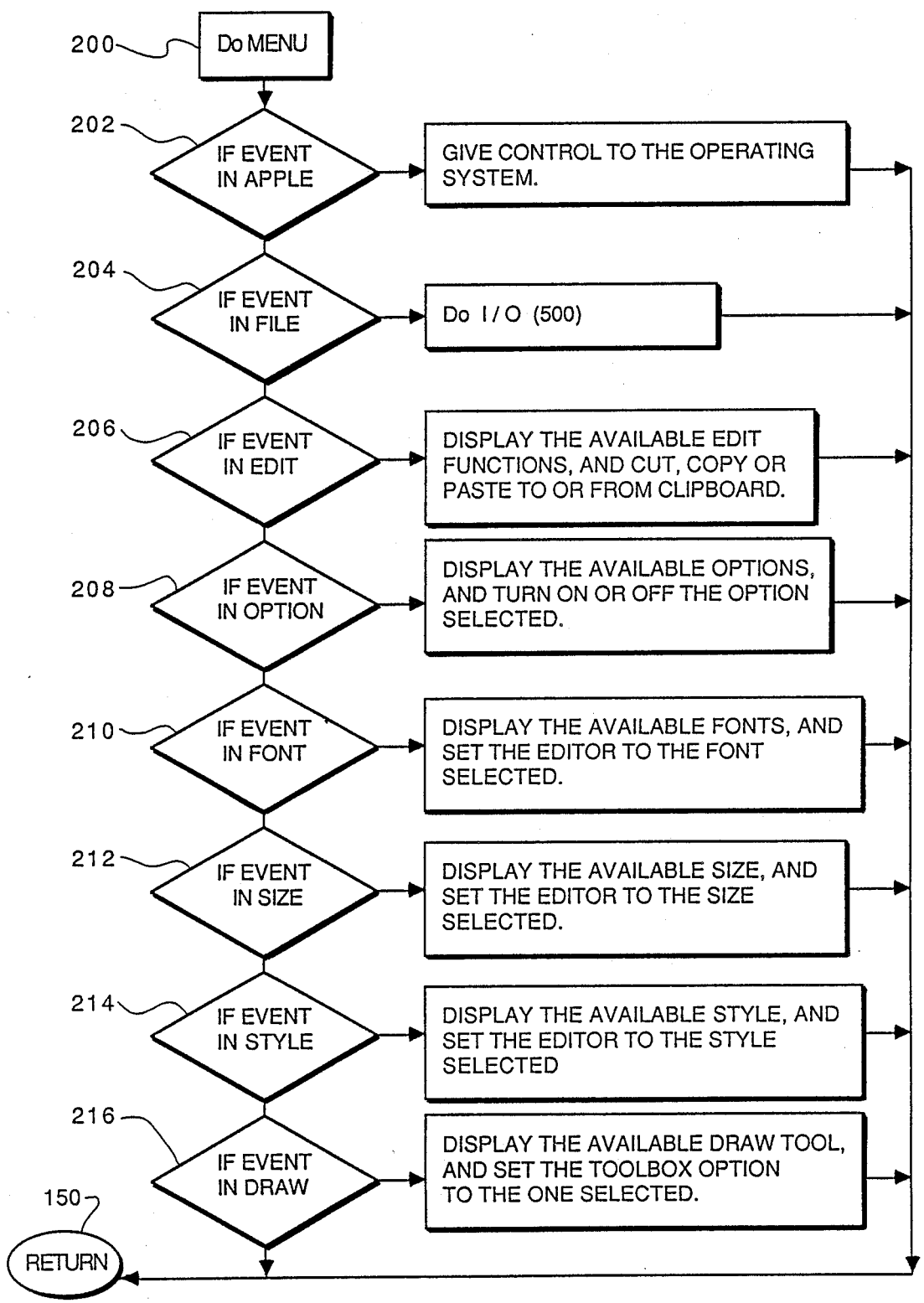
FIG. 5 is a flowchart for the software program associated with the Pull Down Menu.
Figure 6A:
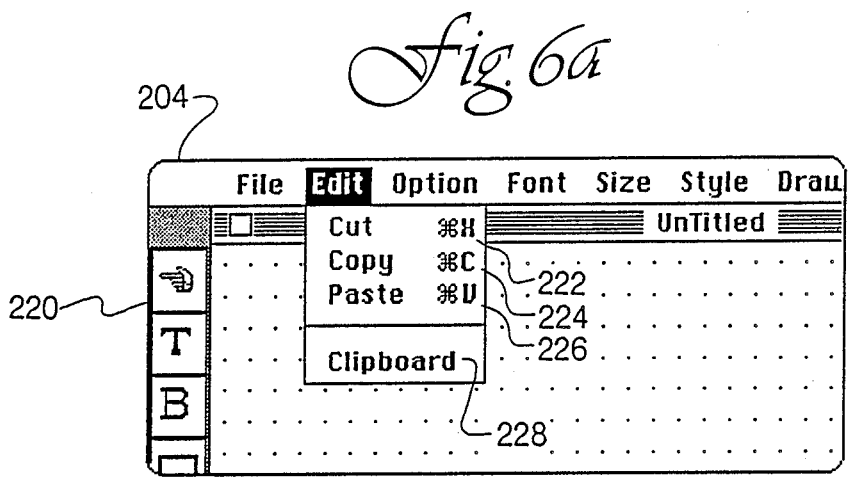
FIGS. 6a–6f are depictions for computer screen displays for various options under the Pull Down Menu.
Figure 6B:
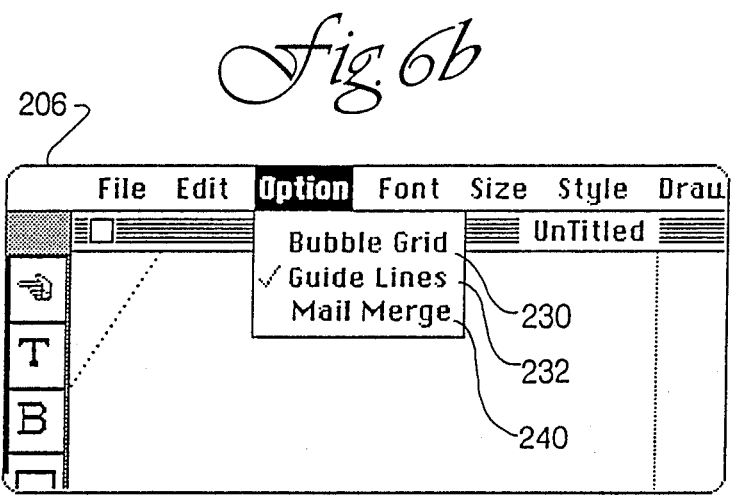

FIG. 5 shows a flowchart for the software program that performs Do Menu 200 for processing any events selected by the user form Pull-Menu 110. If the event is Apple 202, the program passes control back to the operating system to perform whatever tasks outside of the desktop survey application that the user may want to run. If the event is File 204, the program passes to Do I/O 500, a routine that will be described in further detail below. If the event is Edit 206, the program displays the available edit options as shown in FIG. 6a and performs the selected option at the user's direction. If the event is Option 208, the program displays the available options as shown in FIG. 6b and sets or resets the selected option as indicated by the user. If the event is Font 210, the program displays the available fonts shown in FIG. 6c and sets the editor to the font selected. If the event is Size 212, the program displays the available font sizes as shown in FIG. 6d and sets the editor to the selected size. If the event is Style 214, the program displays the available styles as shown in FIG. 6e and set the editor to the selected style. If the event is Draw 216, the program displays the available draw tools and sets the toolbox option for Tools 120 to the one selected. Upon completion of the chosen event, the program returns control to the polling loop via Return 150.

FIG. 6a shows the main screen 100 as it appears when Edit 204 is selected. The options available to the user include Cut 222, Copy 224, Paste 226 and Clipboard 228. Each of these options works with a defined portion of the Content Area 130 that is defined by using the pointer tool 220. The user selects the pointer tool 220 by moving the cursor to Tools 120 and clicking on the pointer tool 220. The defined portion of the Content Area 130 is selected by moving the cursor to the desired portion of the screen and then clicking and dragging the cursor about that portion. Cut 222 cuts or deletes the defined portion of Content Area 130. Copy 224 puts the defined portion of Content Area 130 into the clipboard temporary storage. Paste 226 pastes or inserts whatever is in the clipboard temporary storage to the current position of the cursor. Clipboard 228 displays what is currently in the clipboard temporary storage.

FIG. 6b shows the main screen 100 as it appears when Options 206 is selected. The options available to the user include Bubble Grid 230, Guide Lines 232 and Mail Merge 240. Bubble Grid 230 is used to turn the grid display 234 for Content Area 130 on or off. The grid display 234 (shown in FIG. 6d) is a pattern of dots that indicate all of the possible positions for the response areas 54 in the Content Area 130. The grid display dots will not appear on the survey forms 20 when they are printed. Guide Lines 232 is used to turn the staple area display and center lines on or off. These lines assist the user in positioning the customized questions 52 and the response areas 54 in the Content Area 130. Mail Merge 240 allows the user to merge an external data file with individual records into the survey forms 20 when they are printed. A more detailed description of Mail Merge 240 is provided below.

Figure 6C:
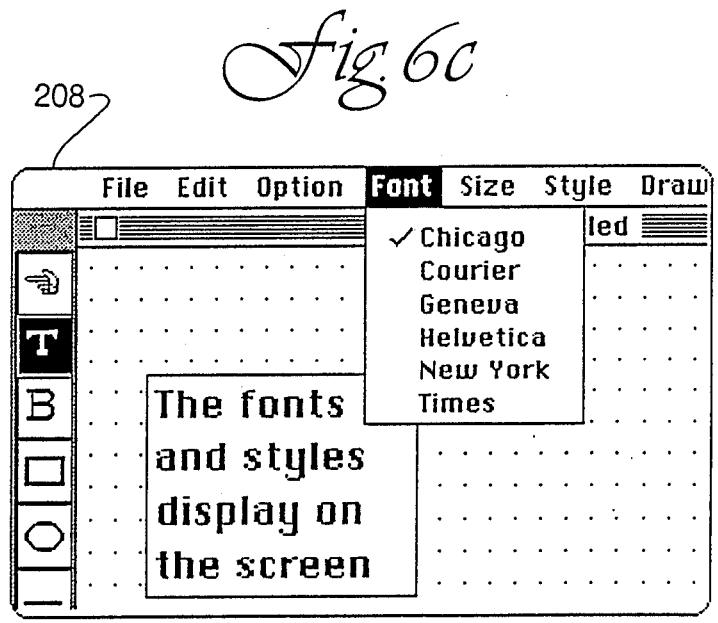
Figure 6D:
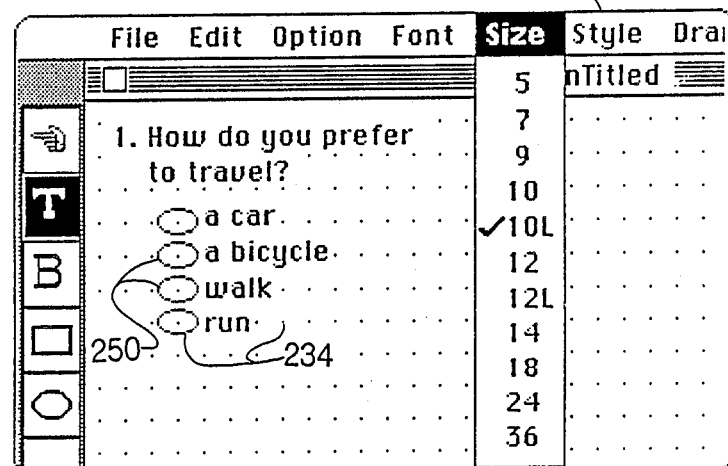
Figure 6E:
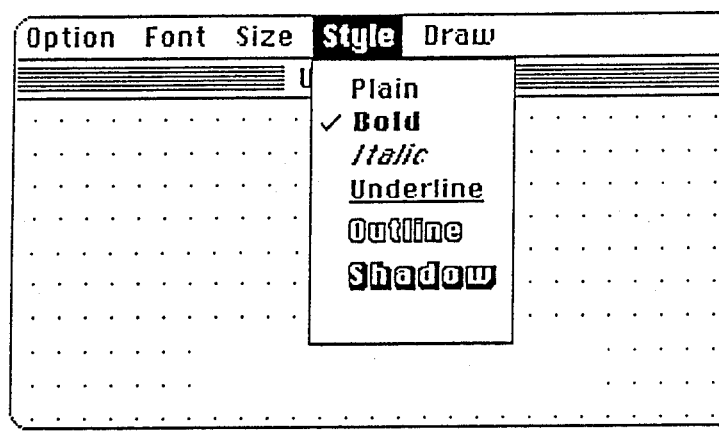

FIG. 6c shows the main screen 100 as it appears when Font 208 is selected. The print fonts that are displayed on this menu are the fonts that are loaded into the operating system for the computer 12. FIG. 6d shows the main screen 100 as it appears when Size 210 is selected. The sizes determine what point size the print font will be displayed in. It is suggested that either 10L or 12L be used when working with the customized questions 52. FIG. 6d shows the main screen as it appears when Style 212 is selected. The print styles available include plain, bold, italics, underline, outline and shadow. For all three of these menus, the changes will be made to the defined portion of the Content Area 130 and to any additional test or graphics that are entered after a selection is made.

Figure 6F:
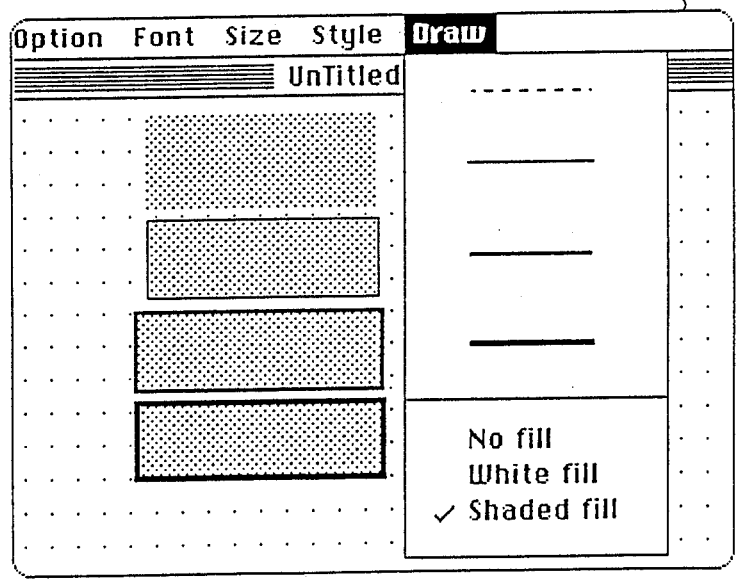

FIG. 6f show the main screen 100 as it appears when Draw 214 is selected. The options let the user select the line thickness for lines, ovals, boxes and arrows to be drawn using the options available under Tools 120. The user may also select the fill pattern to be used for filling any of the boxes produced above.

Tools

Figure 7:
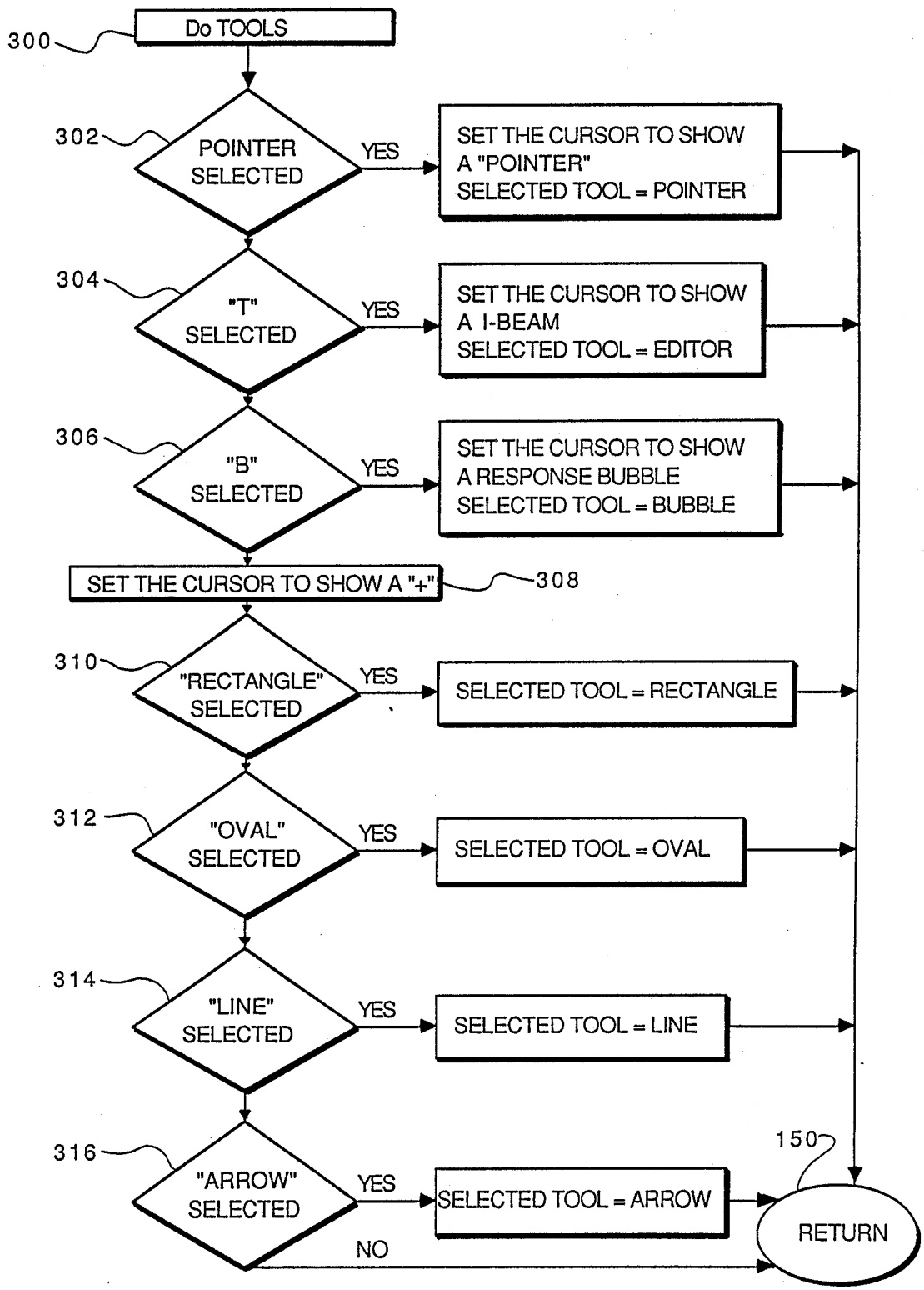
FIG. 7 is a flow chart for the software program associated with the Tools Menu.

Referring now to FIG. 7, a flowchart for the software routine Do Tools 300 is shown. Do Tools 300 allows the user to select the tools in this menu that create and manipulate the customized questions 52, the response areas 54 and the text areas 57 and graphics 58. If the selected event is Pointer 302, the program sets the cursor to show a "pointer" (Pointer 220) and sets the pointer as the selected tool. If the selected event is Text 304, the program set the cursor to show an "I-beam" and sets the editor as the selected tool. If the selected event is Bubble 306, the program sets the cursor to show a "bubble" (Bubble 250 as shown in FIG. 6d) and sets the bubble as the selected tool. At Set Cursor 308, the program sets the cursor for the remaining events to a "+" sign. If the selected event is Rectangle 310, the program sets draw rectangle as the selected tool. If the selected event is Oval 312, the program sets draw oval as the selected tool. If the selected event is Line 314, the program sets draw line as the selected tool. If the selected event is Arrow 316, the program sets draw arrow as the selected tool. The selected tool defines the graphic symbol that the program will draw in the Content Area 130 when the user moves the cursor to a desired location and clicks it. These manipulations are handled by Do Content 400. Once the tool has been selected and the cursor has been set, control is passed back to the polling loop via Return 150.

Content Area

Figure 8:
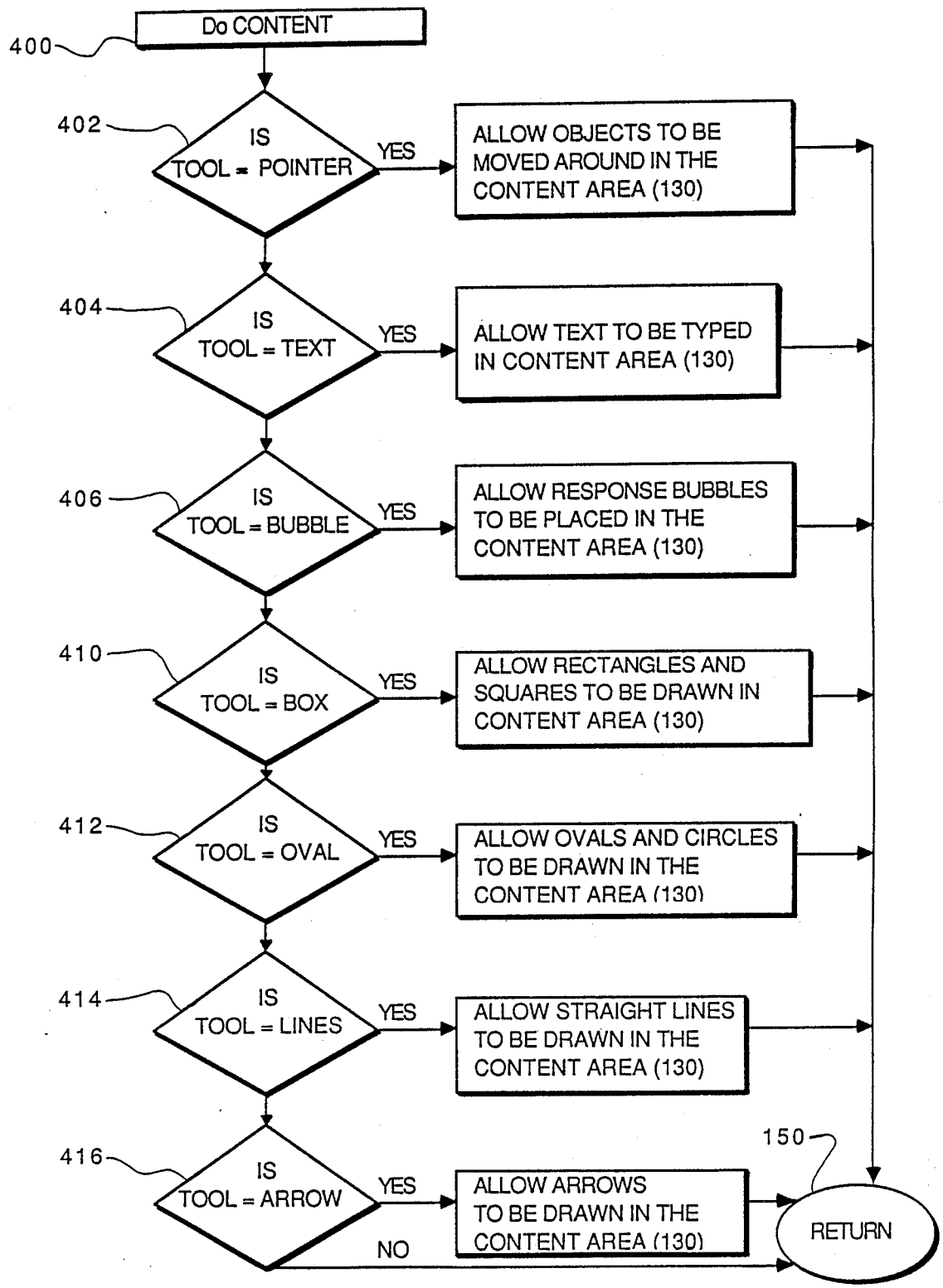
FIG. 8 is a flow chart for the software program associated with the Content Area.

Referring now to FIG. 8, a flowchart for the software routine Do Content 400 is shown. Do Content 400 allows the user to create and manipulate the customized questions 52, the response areas 54 and the text areas 57 and graphics 58 in the Content Area 130 using the selected tool from Tools 120. The user enters this program by clicking the cursor once it has been moved to a desired location in the Content Area 130. When the user finishes using a tool, i.e., the cursor is moved out of the Content Area 130, control is passed back to the polling loop via Return 150.

If the selected tool is the Pointer 402, the user may move a block of text or a graphic shape by clicking on the object and dragging it to a new location. Larger areas including both blocks of text and graphics can be moved by clicking one corner of an area and dragging a dotted box around the desired objects. Then the user may click the cursor inside the dotted box and drag all of the selected objects to a new location. The response areas 54 may be clicked and dragged to new locations, but they cannot be cut or pasted. Because the response areas 54 must always line up with the grid dots of grid display 234 (whether grid display 234 is displayed or not), the program will only allow selected objects that include response areas 54 to be moved to a location where the response areas 54 will coincide with a new set of grid dots. Selected objects may be delected by clicking on an object or clicking and dragging on a group of objects and then entering the Delete or Backspace keys on the computer 12.

If the selected tool is Text 404, the user may enter text at the "I-beam" cursor using the standard text editor routines. Each text entry initiated by clicking the cursor will be treated as a separate block of text for purposes of using the pointer tool. The font, point size and style of the text that will be entered are determined by the current settings of the options in Font 208, Size 210 and Style 212.

If the selected tool is Bubble 406, the user may place or delete the response areas 54. No matter where the cursor is located when it is clicked, the program will "snap" the newly created response area 54 to the grid display 234 automatically, with the center of the response area 54 located concentrically about the nearest bubble grid dot to the current location of the cursor. The use of the bubble grid dots allows the present invention to overcome the alignment problems present in the prior art and insures that each row of response areas 54 will be properly aligned with its corresponding timing mark 24. In one embodiment, the bubble grid dots are vertically spaced apart 14 pixels or 0.200 inches and horizontally spaced apart 12 pixels or 0.166 inches when the grid display 234 is displayed on the main screen 100. This spacing corresponds to the positions for the response areas 54 on a scannable form having a 5 LPI (Lines Per Inch) format. The program determines which vertical and horizontal bubble grid dot to snap on by rounding the current cursor position to the nearest 12 and 14 pixels positions, respectively. It will be apparent that other spacing may be used for other formats, or that the program could translate the placement of the bubble tool on the main screen into the desired placement of the response areas 54 on the survey form 20 by the use of a conversion algorithm.

The remaining tools all allow the user to add simple graphic images to the Content Area 130. If the selected tool is Rectangle 410, the program allows the user to draw rectangles according to the options selected in Draw 214. To draw a rectangle box, click the cursor to anchor the upper right hand corner and then drag the cursor to the lower lefthand corner to expand the rectangle box. To change the size of a rectangle box already drawn, click on the rectangle box with the pointer tool 220 to select it and then click and drag on of the "handles" shown on the side of the rectangle box to size it. Similarly, if the selected tool is Oval 412, the program allows the user to draw oval figures. It should be noted that the oval tool is not used to draw the response areas 54 because the oval tool does not lock the ovals or circles that are drawn onto the bubble grid dots. If the selected tool is Line 414, the user may draw a line by clicking the cursor at one point to another the line and then dragging the cursor to the opposite end of the line. The line thickness is controlled by the options selected in Draw 214. Similarly, if the selected tool is Arrow 416, the user may draw lines with triangle arrow heads on one end.

Input/Output

Figure 10:
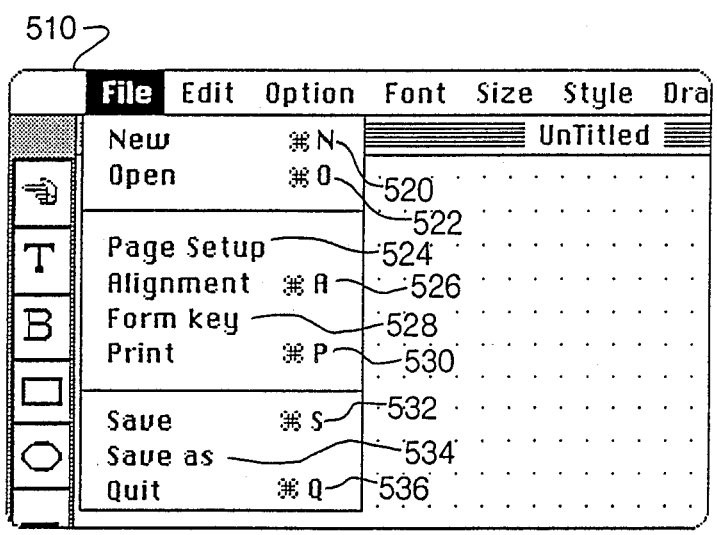
FIG. 10 is a depiction of a computer screen display for the Input/Output Menu.
Figure 9:
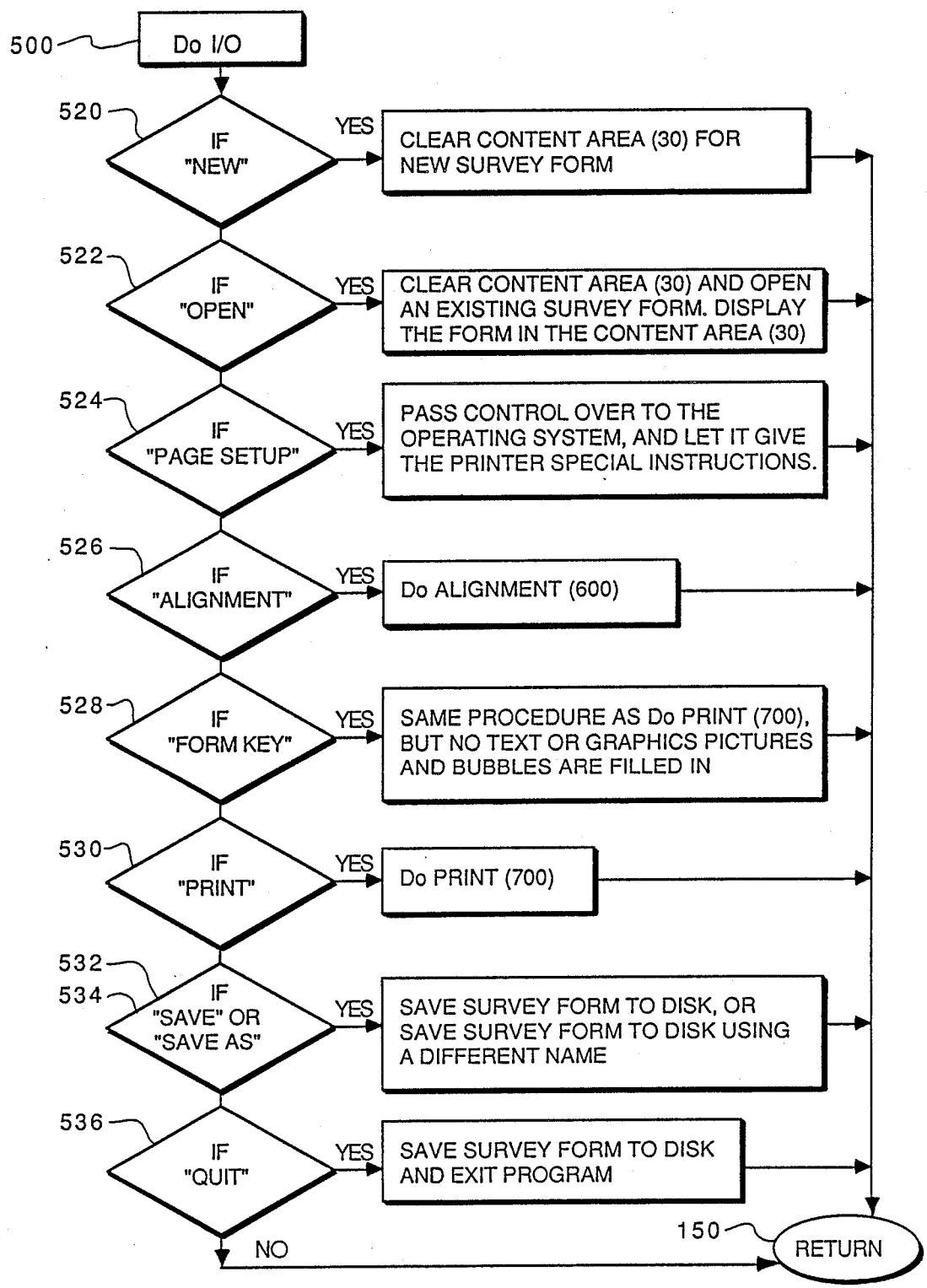
FIG. 9 is a flow chart for the software program associated with the Input/Output Menu.

Referring now to FIG. 9, a flowchart for the software routine Do I/O 500 is shown. Do I/O 500 controls the input and output operations of the production process. The menu presenting the available options for this program is shown in FIG. 10. The user selects the desired event or action from the File menu 510. If the event is New 520, the program closes and saves the current survey form in a file in the computer 12 and then clears the Content Area 130 to allow the user to create a new survey form. If the event is Open 522, the program closes and saves the current survey form in a file in the computer 12 and then clears the Content Area 130 and retrieves an existing file from storage and displays that file in the Content Area 130. If the event is Page Setup 524, the program transfers control to the operating system to modify the default printer settings used by the operating system for the computer 12. If the event is Alignment 526, the program transfers control to Do Alignment 600. If the event is Form Key 528, the program transfers control to Do Print 700 with instructions to print a form key, rather than an actual survey form. If the event is Print 530, the program transfers control to Do Print 700. If the event is Save 532, the program saves the current contents of the Content Area 130 in the currently specified file. Each page of a survey form should be saved as a new file. If the event is Save As 534, the program prompts the user for the new name of the file and then saves the current contents of the Content Area 130 as the newly specified file. If the event is Quit 536, the program queries the user whether any changes made to the Content Area 130 should be saved in the currently specified file and then exits the program, returning control back to the operating system for the computer 12.

Mail Merge

As shown in FIG. 6c, the user may select Mail Merge 240 as one of the options available when Options 206 is selected. Mail Merge 240 allows a separate file containing individualized information known as mail merge records to be merged with the survey forms when they are printed, thereby creating individualized survey forms. The result is seen at mail merge location 60 as shown in FIG. 2a. In one embodiment, a dialog box is displayed when Mail Merge 240 is selected, prompting the user to enter the number of lines and the length of the line for each mail merge record that will be integrated with the survey form 20. The mail merge records are created by the user prior to printing the survey forms 20 and are saved in a file named Mailmerge. The file may be in any number of different formats, including: Macintosh text fields separated by tabs and ending with a carriage return, an ASCII file transferred from a PC with the fields separated by quotations and commas, or an EXCEL file format with fields B through H being 1–40 alphanumeric. The first field of each mail merge control codes is a nine digit mail merge id 64. This is the link between the mail merge control codes and the survey results. The mail merge id is used to generate a mail merge control code 62 that may be scanned by the scanner 16. The mail merge control code 62 is printed on the survey forms 20 along with the mail merge id 64 and the individual mail merge record number 66. In one embodiment shown in FIG. 15b, both the mail merge control code 62 and the mail merge id 64 are printed on the bias bar 40 so as to minimize their observability to the survey taker and to lessen the likelihood of tampering with the mail merge control code 62.

Alignment

Referring now to FIGS. 11a–11d, a simplified explanation of alignment process performed by Do Alignment 600 is shown. While the preferred embodiment of the alignment process is described in detail in co-pending application OVERPRINT REGISTRATION SYSTEM FOR PRINTING A CUSTOMIZED SURVEY FORM AND SCANNABLE FORM THEREFOR, Ser. No. 176,610, it should be recognized that any alignment process that allows each row of the response areas 54 to be aligned within the tolerances established by the timing track 24 would be sufficient for purposes of the present invention.

Essentially, the alignment process of the preferred embodiment "stretches" the planned print area on scannable form 22 so that a plurality of overprint registration marks 80, 82, 84 and 86 will align with preprinted quality assurance (QA) marks 30, 32, 34 and 36. The object of the alignment process is to center overprint registration marks 80, 82, 84 and 86 within their respective QA marks 30, 32, 34 and 36. As shown in FIG. 11a, the first step in performing alignment process is to "target" the alignment by anchoring alignment form 90 with overprint registration mark 80 printed within the home QA mark 30 to establish a base reference point for the planned print area. In one embodiment, home QA mark 30 is located in the upper left hand corner of scannable form 22, at the corner of the edges opposite both timing track 26 and bias bar 40. After the three copies of an alignment form 90 are printed, an alignment screen 92 that shows overprint mark indicator 94 in proper alignment with QA mark indicator 96 is displayed, as shown in FIG. 12. The user examines all three copies of alignment form 90 and notes the average location of overprint registration mark 80. The user next enters the extent of deviation from the desired alignment by duplicating the average location of overprint registration mark 80 on alignment screen 92 by moving overprint mark indicator 94 to its observed average position with respect to QA mark indicator 96. Computer 12 then modifies the stored location information for overprint registration mark 80 based on the movement of overprint mark indicator 94 and prints another three copies of alignment form 90. This process is repeated until the user is satisfied that the average location of overprint registration mark 80 is centered as closely as possible within QA mark 30. This same process is repeated for each of the remaining QA marks 32, 34 and 36 as shown in FIGS. 11b–11d.

Figure 13A:
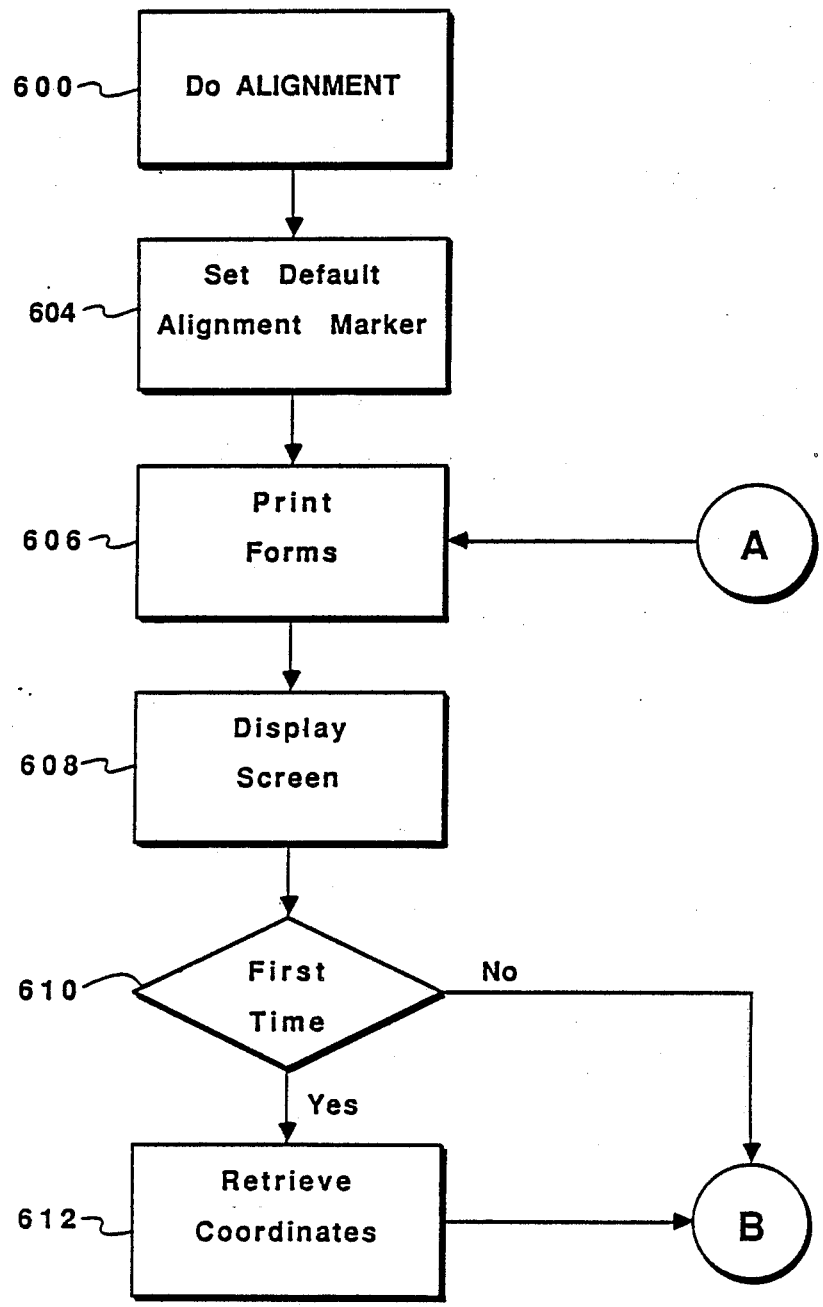
FIGS. 13a–13b are a flow chart for the software program associated with the Alignment process.
Figure 13B:
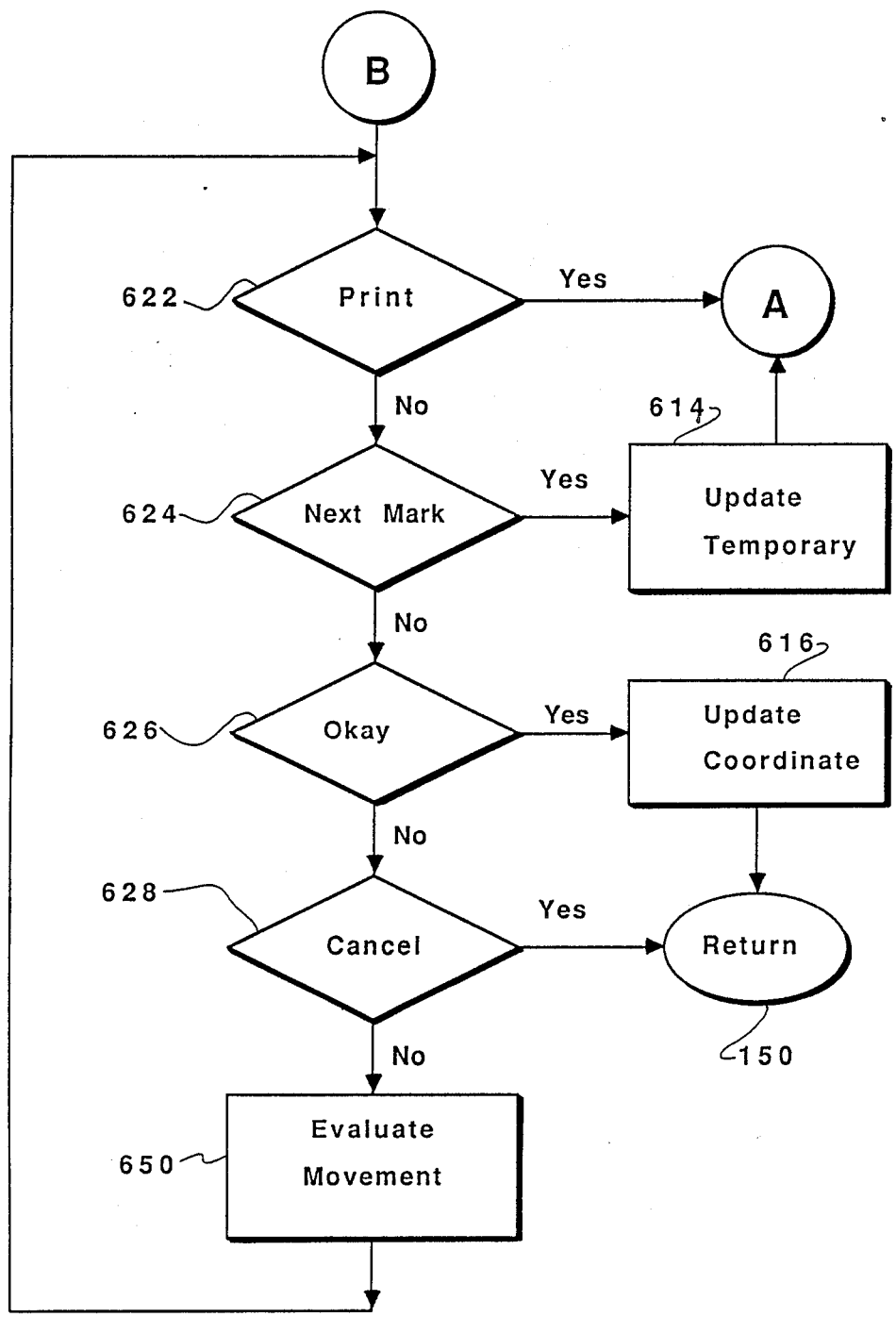

Referring now to FIGS. 13a–13b, a functional flow chart for the software program that comprises Do Alignment 600 is shown. The default alignment mark for starting the alignment sequence is set to overprint registration mark 80 and the default coordinates for that mark are set at Set Default Alignment Mark 604. The default coordinates for overprint registration mark 80 represent the distance from the top and left edges of scannable form 22 to the center of QA mark 30. Three alignment forms 90 are printed at Print Forms 606 with overprint registration mark 80 located at the default coordinates. After the three alignment forms 90 are printed, alignment display screen 92 is presented to the user at Display Screen 608 as shown in FIG. 12. If this is the first time through alignment process 600 (First Time 610), Retrieve Coordinates 612 places the default coordinates for the centered overprint registration marks 80, 82, 84 and 86 into temporary storage to be modified. At this point, the user is ready to enter the average position of overprint registration mark 80 with respect to home QA mark 30. In the right hand portion of alignment screen 92, menu 620 displays the three alternatives available to the user (Print, Okay and Cancel), along with the select registration mark designators (Home 630, Upper Right 632, Lower Left 634, or Lower Right 636).

The user may select among any of the alternatives presented in menu 620, or may change the currently selected registration mark designator. Print 622 will print three copies of alignment forms 90 with all of the overprint registration marks 80, 82, 84 and 86 currently selected or previously aligned. Next Mark 624 compares the select registration mark designators Home 630, Upper Right 632, Lower Left 634 and Lower Right 636, with the currently selected overprint registration mark. If the two are not the same, the user has selected a different alignment mark to be aligned and the program will reflect the change and then print three copies of alignment form 90 using the coordinates stored in temporary storage to position the newly selected alignment mark. Okay 626 updates the old alignment mark coordinates with the coordinates currently stored in temporary storage (Update Coordinate 616) and then returns to the main screen 100 via Return 150. Cancel 628 returns the control to the main screen 100 via Return 150 without updating the old alignment mark coordinates.

If none of the above options were selected, Evaluate Movement 650 examines the placement of registration mark indicator 94 with respect to QA mark indicator 96 as shown on screen 92. The program then determines the number of horizontal and vertical pixels that registration mark indicator 94 was moved on alignment screen 92. Using this information, the movements are translated from 72 pixels per inch to 300 pixels per inch, and then to increments in terms of thousandths of an inch. These horizontal and vertical movement increments are then added to or subtracted from the horizontal and vertical coordinates for the currently selected alignment mark as stored in temporary storage. The Menu 620 loop is then repeated until the user selects an option to exit from the loop.

The individual alignment coordinates and offset values determined by Do Alignment 600 are listed below. These parameters describe how the customized questions 52 and response areas 54 are placed in the print area of scannable form 22 to achieve appropriate alignment with timing track 24.

Home—the horizontal and vertical distances from the top and left edges of scannable form 22 to the center of QA mark 30.
Upper Right Vertical—the total distance from QA mark 30 to QA mark 32.
X-Column-Pixels—Upper Right Vertical divided by the maximum number of response areas 54 in a row, i.e. the distance between each vertical response area.
Upper Right Skew—any horizontal variance between the absolute value of the distance from the top edge of scannable form 22 and the center of QA mark 30 and at QA mark 32.
Lower Left Skew—similar to Upper Right Skew, any vertical variance between the absolute distance from the edge of scannable form 22 and the center of QA mark 30 and QA mark 34.
Lower Left Horizontal—total vertical distance from the center of QA mark 30 to the center of QA mark 34.
Y-Row-Pixels—Lower Left Horizontal divided by the maximum number of response areas 54 in a column, i.e., the distance between each horizontal response area.
Lower Right Skew—any horizontal variance between the center of QA marks 34 and QA marks 36.
Bubble-Y-Row-Max—52 response areas 54 in a row.
Bubble-X-Column-Max—45 response areas 54 in a column.

Print

The software program that comprises Do Print 700 is utilized for printing both the actual survey forms 20 and the form key 68. The only difference between the two options is that when the form key 68 is printed on the scannable form 22, none of the customized questions 52 or text areas 57 and graphics 58 are printed and all of the response areas 54 are printed as blackened-in ovals to be scanned by the scanner 16, rather than as ovals to be filled in when the survey form 20 is fielded. By printing the form key 68 in this manner, the scanner 16 will be able to detect only the positions of the response areas 54 that the user wants to have scanned. If the customized questions 52 or the text areas 57 or graphics 58 were printed on the form key 68, the analysis process would be required to differentiate those items from the response areas 54 that the user wants to have scanned. In a preferred embodiment of the invention, the alignment coordinates and offset values established by Do Alignment 600 are used to generate absolute vertical and horizontal placement values for the customized questions 52; the response areas 54 are then printed using the PostScript printer driver language. Other methods of establishing the alignment coordinates and offset values and other printer driver languages may used without departing from the spirit of the present invention.

Figure 14A:
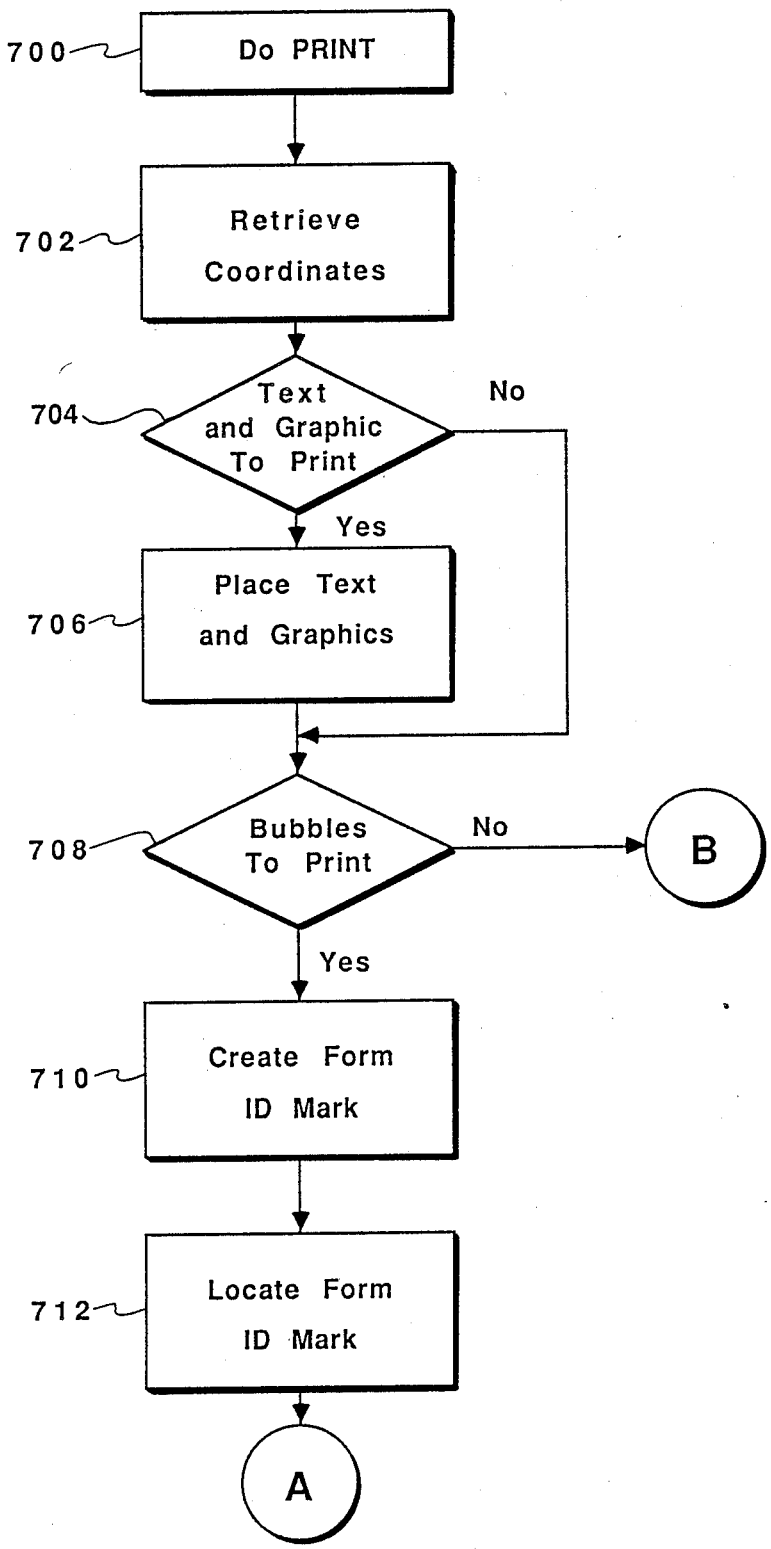
FIGS. 14a–14b are a flowchart for the software program associated with the Print process.
Figure 14B:
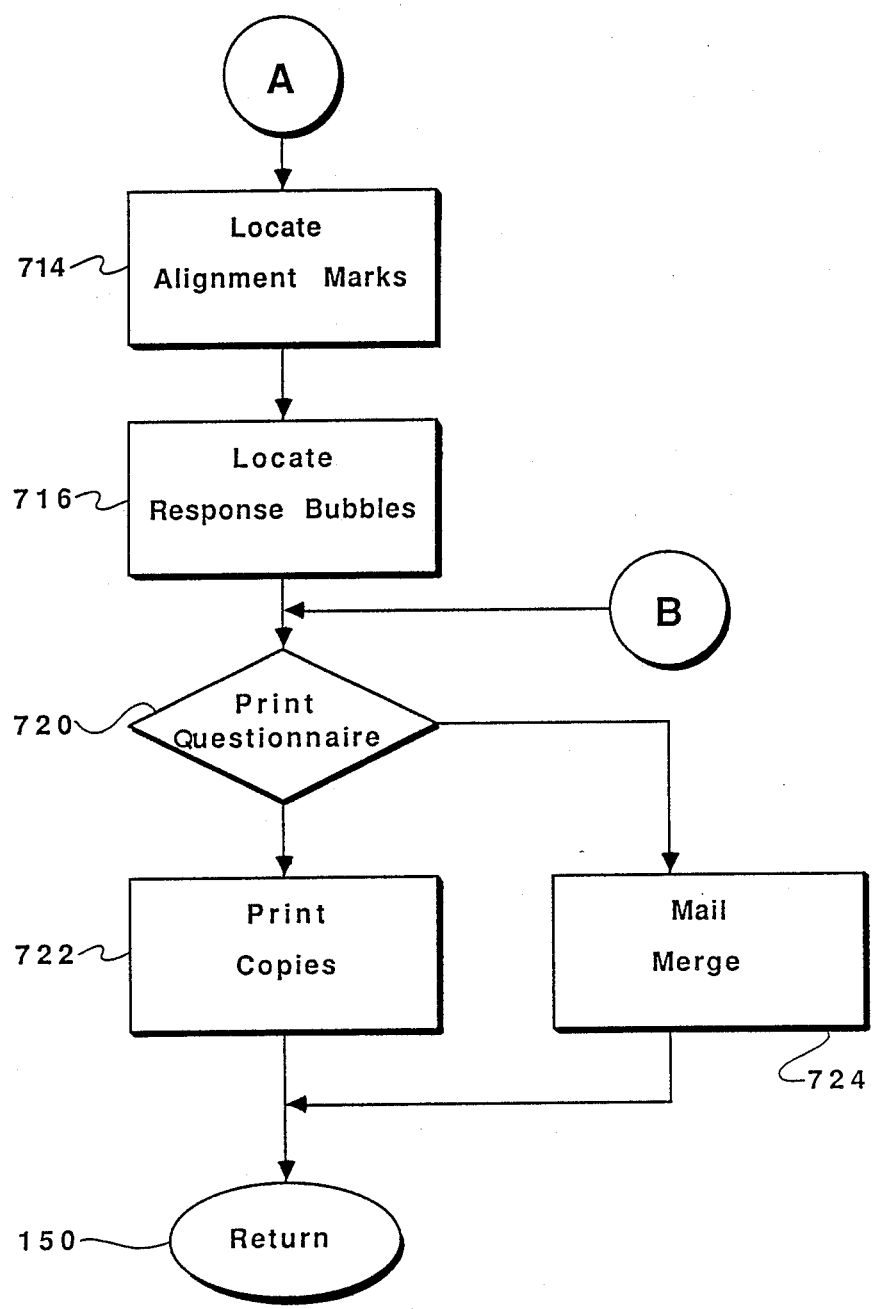

Referring now to FIGS. 14a–14b, a functional flowchart for the software program Do Print 700 is shown. At Retrieve Alignment Coordinates 702, the alignment coordinates for Home 630, Upper Right 632, Lower Left 634 and Lower Right 636 are retrieved along with the offset values for X-Column-Pixels, Upper Right Skew, Lower Left Skew, Y-Row-Pixels, and Lower Right Skew. For each graphic image, response area, customized question or alignment mark to be located on the survey form 20, the element is offset by the absolute coordinates stored for Home 630. In effect, this offsets the entire print area of scannable form 22 by the targeted home coordinates.

At Text and Graphic To Print 704, the program determines whether there are any text areas 57, graphics 58 or customized questions 52 to print. If so, for each item the relative coordinates of that item are determined from the placement of the item by the user in the Content Area 130. At Place Text and Graphics 706, these relative coordinates are then modified with the alignment coordinates to determine where to place the item on the planned print area for scannable form 22. In a preferred embodiment, each text area 57, graphic 58 or customized question 52 is represented as a rectangle whose corner coordinates will define the location of the item on scannable form 22. In locating the item, the following values are calculated:

Column Print Position=(Upper Left Vert. Relative Coordinate)*(X-Columns-Pixels/12).

Top Row Print Position=(Upper Left Horiz. Relative Coordinate)*(Y-Row-Pixel/15).

Bottom Row Print Position=Lower Left Horiz. Relative Coordinate—((Lower Left Horiz. Relative Coordinate—Upper Left Horiz. Relative Coordinate)/15)*(15-Y-Row-Pixels)).

Once the graphic and text rectangles have been positioned, Bubbles To Print 708 determines whether there are any response areas 54 to be printed. If so, a unique form identification mark 70 is first calculated at Create Form ID Mark 710. The form identification mark 70 is based upon the number and positioning of the arrangement of the response areas 54 as located in the Content Area 130. It is used to identify the particular pattern of response areas 54 on this survey form 20 and to ensure that the proper version of the survey form will be scanned if more than one version of a survey form is created. In a preferred embodiment, the form identification mark 70 is based on the number of response areas 54 that will be printed according to the following equations:

For each Response area 54

Col_Row_Total=(100*Column_Position)-+Row_Position

When all of the Response areas 54 are added together

Tempid=remainder(Col_Row_Total/10,000)

Tempid2=Tempid*Total_Number_Bubbles

Tempid3=remainder(Tempid2/10,000)

Formid=Tempid3+Current+Time(expressed in military format).

By using both the number and location of the positions of the response areas 54, a unique value is calculated for the form identification mark. In addition, the particular version of the survey form 20 is also uniquely identified by the time that the survey form 20 is printed. In one embodiment, the program converts Formid from a decimal to a binary format represented as a 2 **12 number. The form identification mark 70 is comprised of a string of data marks and non-data marks (mark coded format) representing the binary format of Formid and is printed in the print area below bias bar 30 by Locate Form ID Mark 712. One embodiment of a software program written in Pascal for calculating and printing the form identification marks 70 is as follows:

```
Procedure DoFormIDMarks;
BEGIN
    DrawString('newpath');
    mark_pos:=45;
    while mark_code > 0 do
    begin
        mark_status:=mark_code mod 2;
        if mark_status = 1 then
```

-continued
```
        begin
            Cal_x_y_Pos (mark_pos, 51, false);
            DrawText (@formmark, 1, 30);
        end;
        mark_pos:=mark_pos - 1;
        mark_code:=mark_code div 2;
    end;
END;
```

At Locate Alignment Marks 714, alignment marks 80, 82, 84, and 86 are located in the print area based upon the alignment coordinate values of Home 630, Upper Right 632, Lower Left 634 and Lower Right 636. At Locate Response Bubbles 716, the center coordinates for each response area 54 to be printed are calculated based on the relative row and column values and the response area is located in the correct position in the print area. In locating response areas 54 and alignment marks 80, 82, 84, and 86, the following values are calculated:

Column Print Position=(Relative Row*Lower Left Skew)+(Relative Column*X-Column-Pixels).

Skew Max=(Relative Row/Bubble-Y-Row-Max)*(Lower-Right Skew/Bubble-Y-Row-Max).

Skew Offset=Skew-Max*(Relative Column/Bubble-X-Column-Max).

Row Print Position=(Relative Row*Y-Row-Pixels)+((Upper-Right-Skew +Skew-Offset)*Relative Column).

In addition to the use of the grid display in the Content Area 130, the present invention overcomes the problems present in the prior art by determining the individualized placement values for each response area 54 to be located in the print area. Conventional software drawing programs do not perform this individualized placement; rather, a string of response areas might be tied together and all of the subsequent placements for the response areas in the string would be based upon displacements from the original response area. This is also the case if all of the items are located in the print area based on displacement values from a single axis location. By including the Lower Left Skew, Skew Max and Skew Offset in the calculations for placing each response area 54, there is no accumulation of skew errors in either the horizontal or vertical dimension that would otherwise result in a later-placed response area 54 being misaligned with respect to its corresponding timing mark 26 and ultimately possibly scanned as a valid data mark. Because both the Column Print Position and the Row Print Position are rounded up or rounded down appropriately to the nearest pixel, the present invention achieves the finest resolution of which laser printer 14 is capable.

Figure 15A:
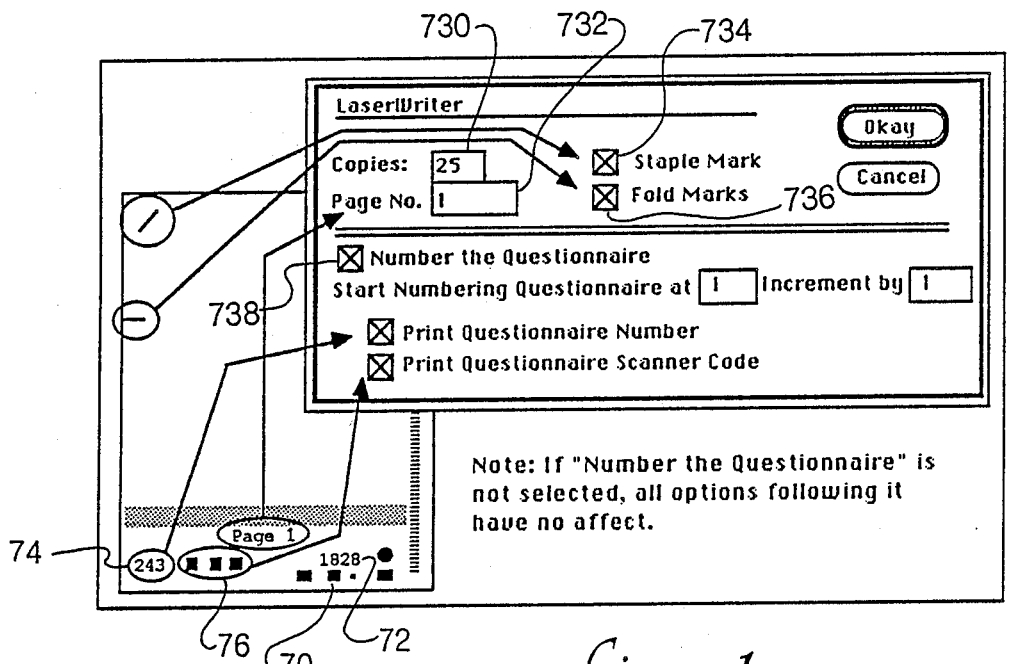
FIGS. 15a–15b are a depiction of a computer screen display showing two dialog boxes for the Print process.
Figure 15B:
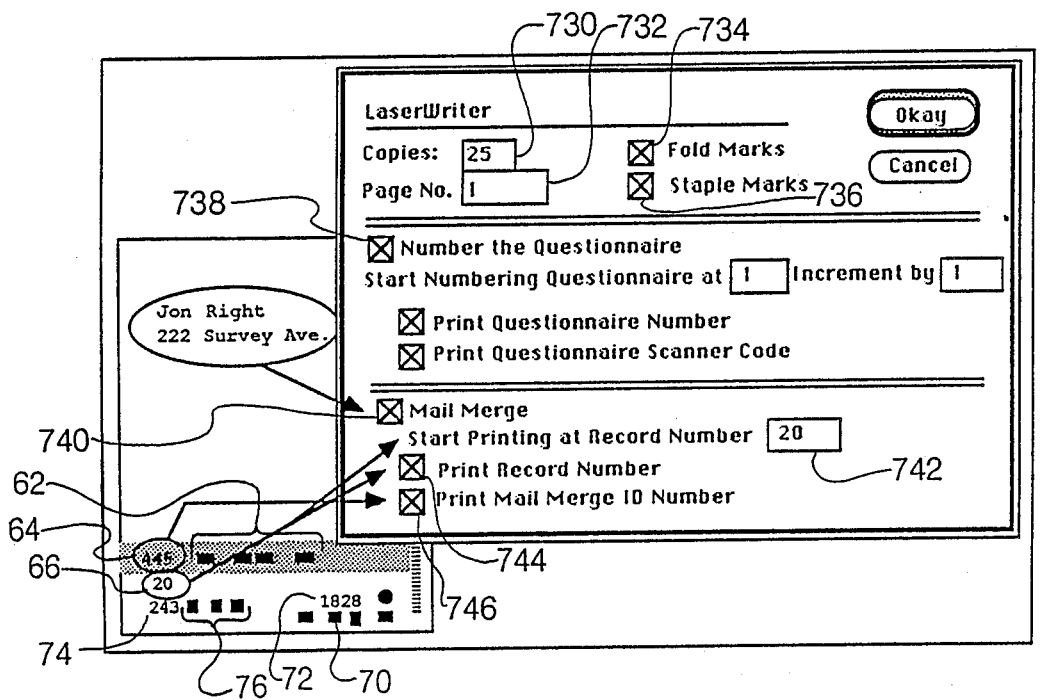

At Print Questionnaire 720, the print area for each survey form 20 has been completed and the survey form 20 is ready to be printed by laser printer 14. The user now has the option of entering a specific number of survey forms to be printed (Print Copies 722), or combining survey forms 20 with the mail merge file so that the individual records are inserted into each survey form as it is printed (Mail Merge 724). Referring to FIGS. 15a–15b, samples of the Print dialog boxes for both Print Copies 722 and Mail Merge 724 are shown.

For the Print Copies 722 dialog box shown in FIG. 15a, the user may enter the number of copies 730 of the survey form 20 to be printed, the page number 732 of the survey form 20 (e.g., if there is more than one survey form comprising a survey booklet), and two print options—staple marks 734 and fold marks 736—as indications to the persons assembling the survey forms where to staple and fold the survey forms. If the user selects Number Questionnaire 738, each survey form 50 will be printed with a unique sequence number 74 and corresponding sequence number marks 76. For the Mail Merge 724 dialog box shown in FIG. 15b, the user may select number of copies 730, page number 732, staple marks 734 and fold marks 736, just as with Print Copies 722. Similarly, the user may also select Number Questionnaire 738. If the user selects Mail Merge Option 740, each survey form 20 is merged with a record from the Mailmerge file in the manner described above. For each survey form printed, the user has the option of selecting: what record in the Mailmerge file to start with, Record Number 742; whether the record number will be printed, Print Record Number 744; and whether the mail merge identification marks 70 will be printed, Print Mail Merge ID 746. After the survey forms 20 have been printed, control is returned to the main screen via Return 150.

Alignment of the individual survey forms 20 can also be checked automatically by scanner 16. In one embodiment, QA marks 32 and 34 are overprinted with alignment marks 82 and 84 and QA mark 36 is overprinted with alignment mark 86 during the printing of survey forms 20. To assist in verifying the accuracy of alignment between QA marks 32 and 34 and alignment marks 82 and 84 by scanner 16, alignment marks 82 and 84 are printed as circles larger in diameter than quality assurance marks 32 and 34, but smaller in diameter than the response areas 54. Alignment mark 86 is printed as a solid circle within QA mark 36. Computer 18 can be instructed to verify that scanner 16 properly detected alignment mark 86 as a valid data mark, and that scanner 16 did not detect any valid data marks at quality assurance marks 32 and 34, or any combination of valid and invalid data marks, thereby indicating that alignment marks 82 and 84 were not detected.

ANALYSIS

The analysis process of the present invention is primarily concerned with two functions: (1) defining the fields comprised of groups of response areas to be scanned, and (2) scanning the information contained in those fields. It will be apparent that, once the information has been properly scanned from the survey form 20 and is arranged in correctly defined fields, any number of statistical analysis programs or packages may be used to actually analyze and interpret this data. The analysis process of the present invention allows the user to more quickly and accurately accomplish the definition and scanning of the information, thereby allowing more time to be spent on the analysis and interpretation of that information.

Figure 16A:
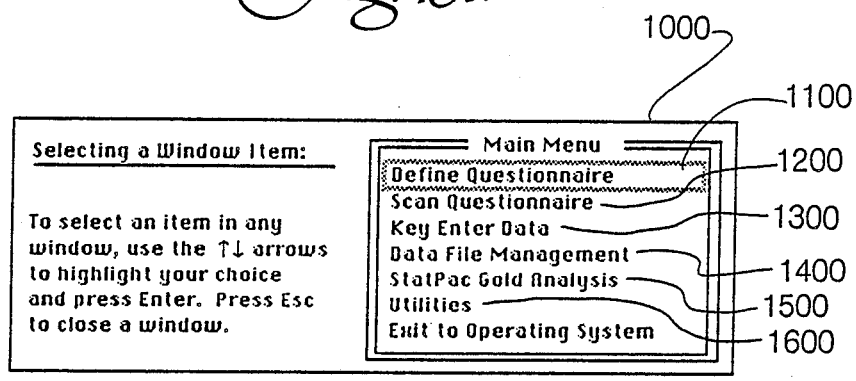
FIGS. 16a–16b are a depiction of a computer screen displays for the Analysis and Define Questionnaire processes.
Figure 17:
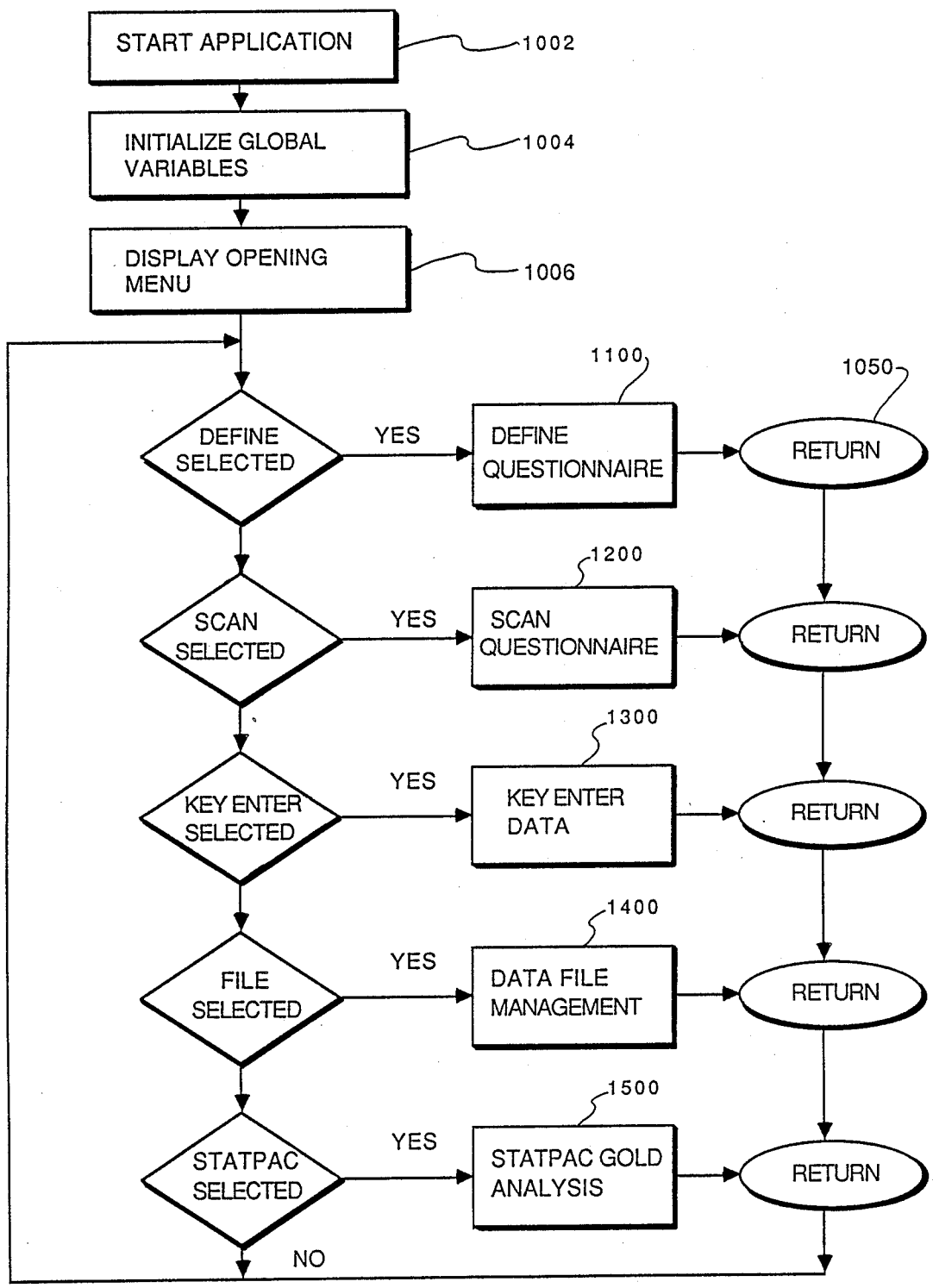
FIG. 17 is a flowchart for the software program associated with the overall flow of the Analysis process.

With reference to FIG. 16a an Opening Menu 1000 for the software program that comprises the analysis process is shown. In a preferred embodiment, the analysis process software program is written for an IBM AT computer and uses the pop-up screen menus compatible with the windowing operating system for that computer system. All of the actions or events that a user may select are accessed through the Opening Menu 1000 that is divided into Define 1100, Scan 1200, Key Enter 1300, Data File Management 1400, StatPac 1500, and Utilities 1600. The flowchart for the overall flow of the software program that drives the main screen 1000 is shown in FIG. 17. At Start Application 1002, the user has selected the desktop survey system analysis application and the software program is loaded into computer 18. At Initialize 1004, all of the global variables for the software program are initialized. At Display Opening Menu 1006, the opening menu with all of the above-listed options is displayed and the program enters a polling loop waiting for directions from the user as to what option will be selected. Depending upon which option is selected, control is passed to that option to perform the selected task and then control will be returned to the Opening Menu 1000 via Return 1050.

Define

Figure 16B:
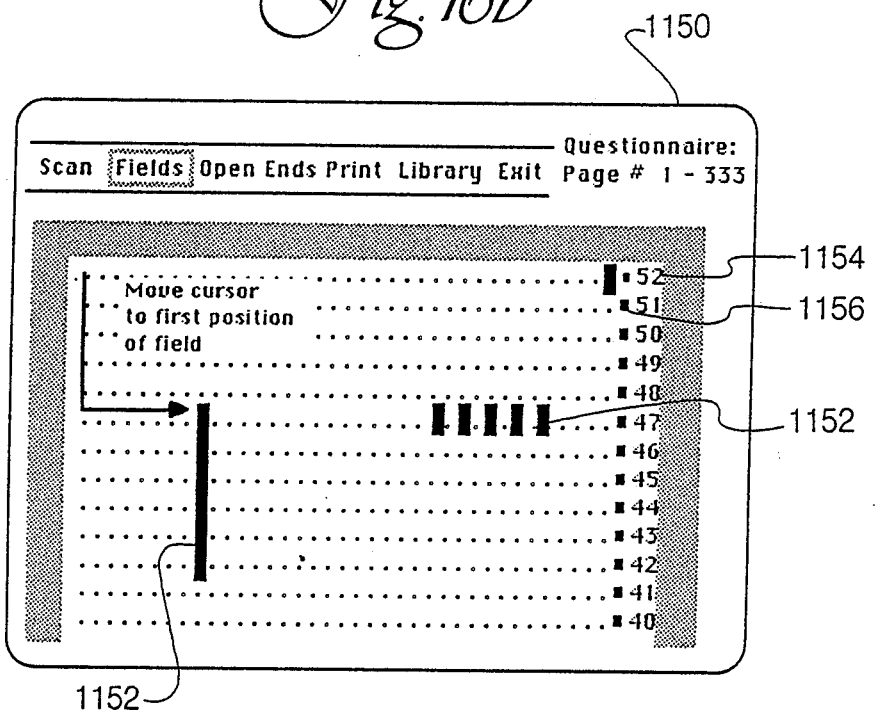
Figure 18A:
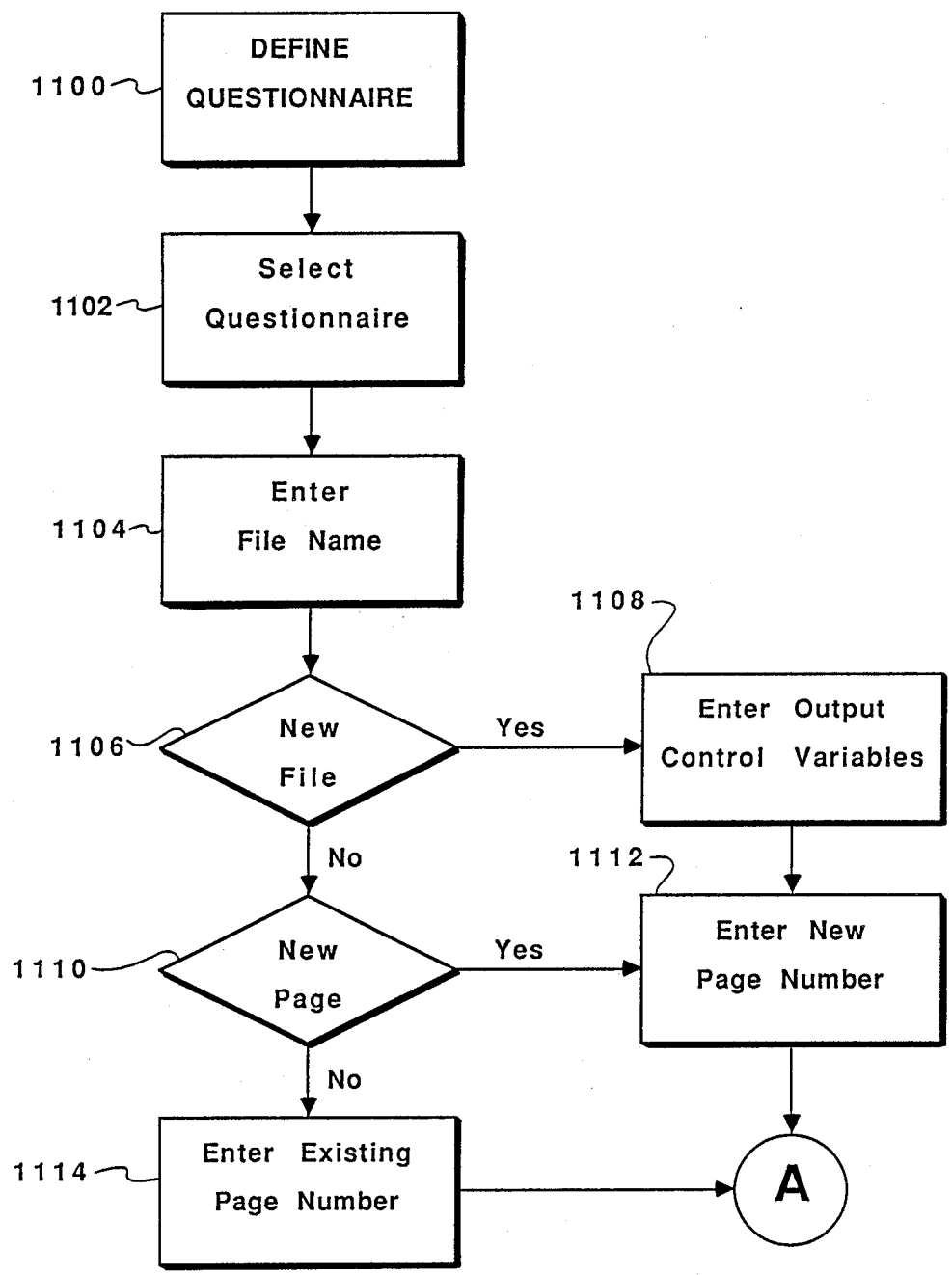
FIGS. 18a–18c are a flowchart for the software program associated with the Define Questionnaire process.
Figure 18B:
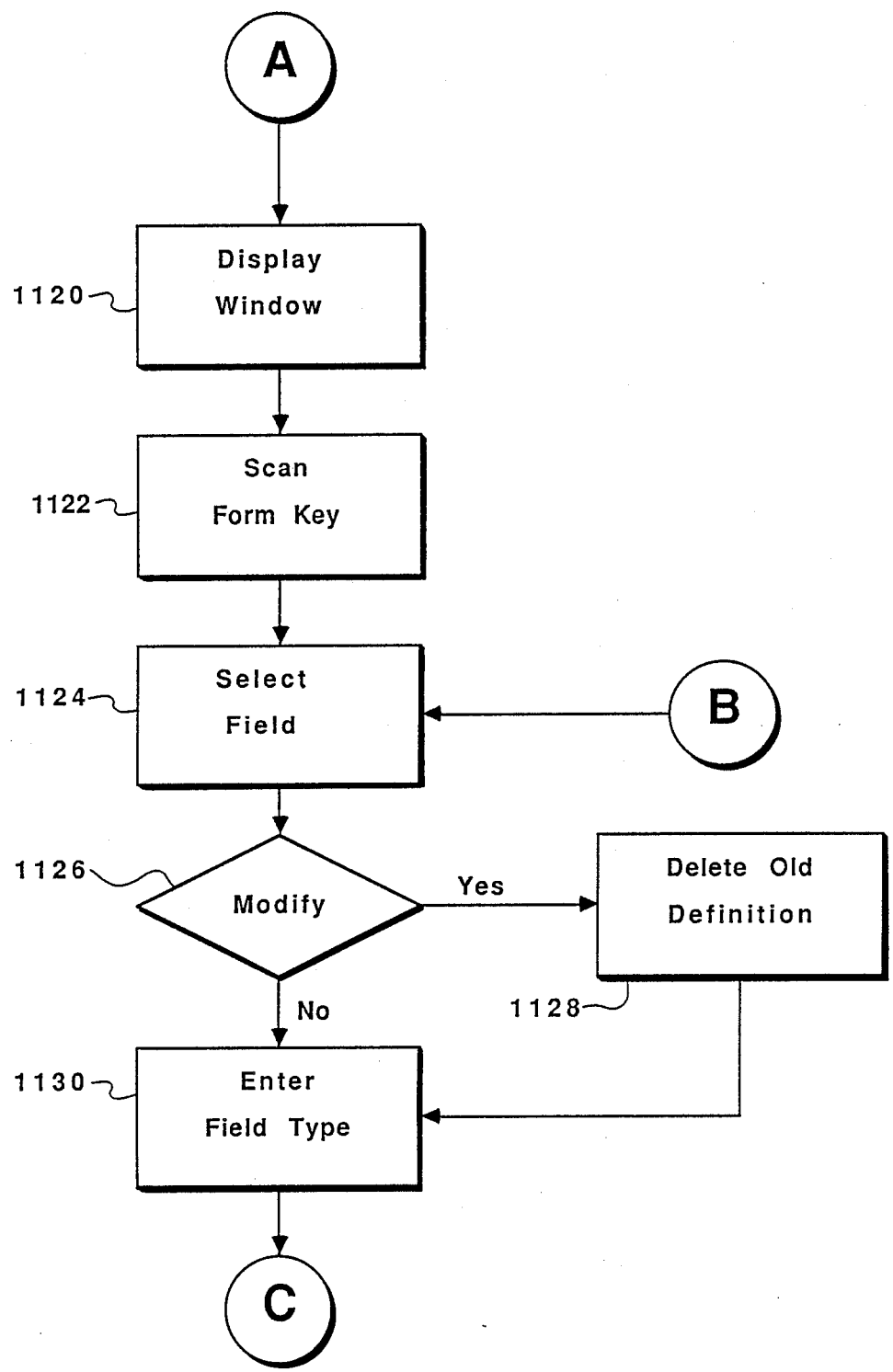
Figure 18C:
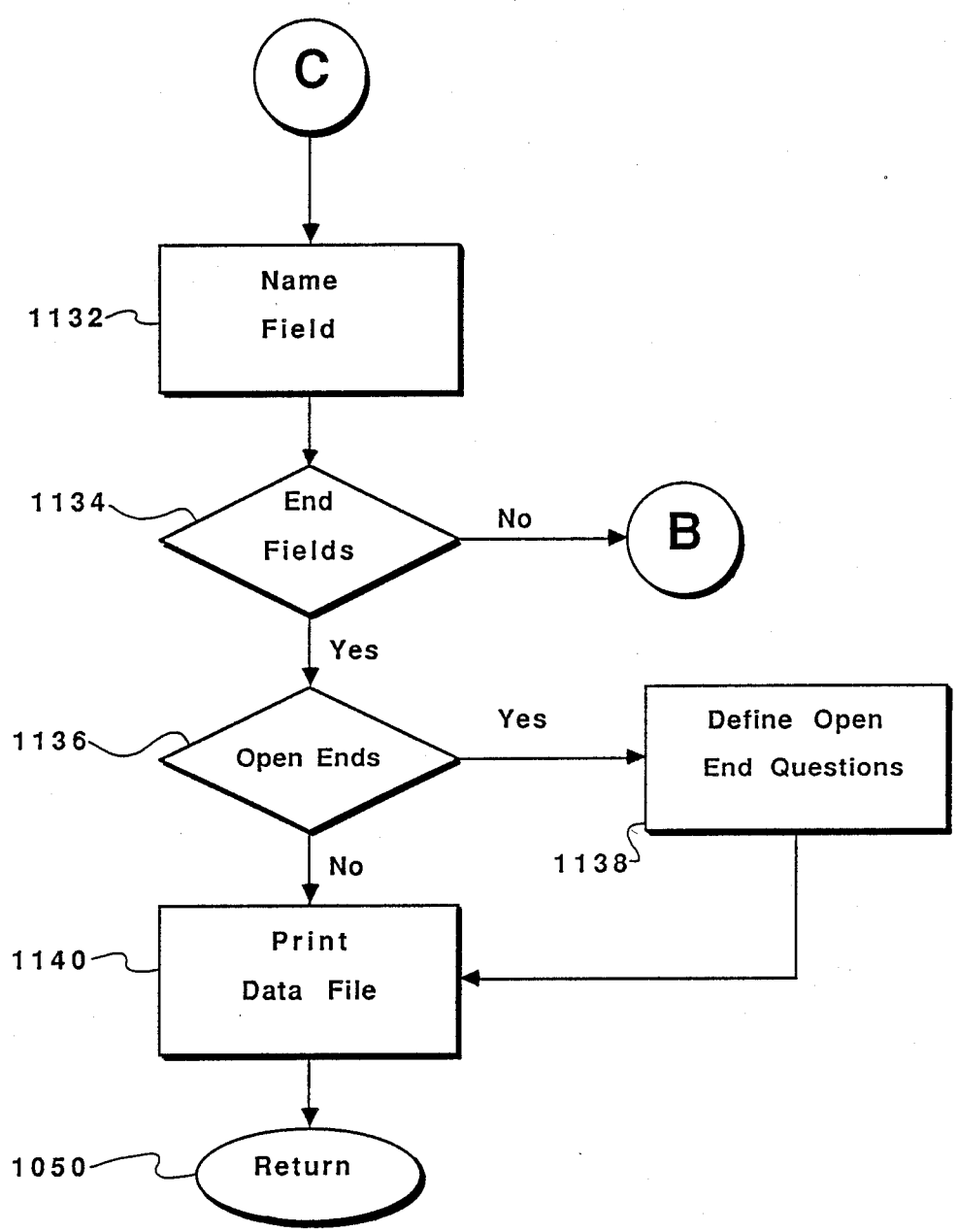

Referring now to FIGS. 18a–18c, the general flow of the Define Questionare 1100 option will be explained. At Select Questionnaire 1102 the user instructs the program whether to work on a new survey form or an existing survey form. At Enter File Name 1104, the user enters the name of the file for the desired questionnaire. This name will be used to designate the file where the information relating to all of the survey forms that comprise the questionnaire will be stored. Each survey form 20 is referred to as a page of the questionnaire being defined. At New File 1106, the program compares the data file name with the existing data file name to determine if a new file has been selected. If a new data file has been selected, at Enter Output Control Variable 1108, the user enters certain output control field information to be added to the questionnaire file. This information includes the batch, sequence number, data scanned, a user-defined constant and the identification number 74 for each questionnaire that is scanned. In one embodiment, this information is stored in the first 29 positions of an individual questionnaire's data record. If an existing file has been selected, at New Page 1110, the user decides whether to add another page to an existing questionnaire or to make changes to an existing page of an existing questionnaire. At Enter Existing Page Number 1114, the user selects the page number to be modified. At Enter New Page Number 1112, the user enters the new page number to be created. At Display Window 1120, the Define Questionnaire Window 1150 as shown in FIG. 16b is displayed on the screen for the computer 18. This window is where the fields of the survey form 20 will be defined.

The next step is to scan the form key 68 using the scanner 16. At Scan Form Key 1122, the user places the form key 68 face up in the scanner 16 with the form identification marks 70 and bias bar 40 entering the scanner 16 first. To start the scanning, the user presses the enter key on the computer 18 to activate the scanner 16. When the form key 68 is read by the scanner 16, black marks 1152 are displayed on the Define Questionnaire Window 1150 at the exact locations where the response areas 54 were filled in with blackened ovals 69 on the form key 68. The numbers 1154 and smaller marks 1156 along the right hand side of Define Questionnaire Window 1150 represent the individual timing marks 26 that comprise timing track 24 of the survey form 20 being scanned.

The user is now ready to define the fields corresponding to the response areas 54 whose positions were just scanned. Defining the fields is comprised of instructing the computer 18 what group of response areas 54 will be combined together to constitute a field and what values will be given to the individual response areas 54 in that field if that response area is marked on the survey form 20. At Select Fields 1124, the user moves the cursor to a particular groups of black marks 1152 on the Define Questionnaire Window 1150. At Modify 1126, the user moves the cursor to the first black mark position in the field. If the user is changing an existing field, the user selects this particular field by hitting the Enter key, deletes the current field definition by hitting the Delete key (Delete Old Definition 1128) and then hits the Enter key a second time to open the definition for the field type to be used for the selected field. At Enter Field Type 1130, the user selects the field type or definition that will be applied to the group of black marks 1152 currently pointed to by the cursor. The field type may be either a standard definition or the user may define a new field type. Examples of various field types are shown in FIG. 19. Other suggested field types might include:

| | | |
|---|---|---|
| 1 | Response | this field type would be used to indicate single bubble fields. A data mark would score as a 1, no data mark would score as a 0. |
| 0-1 | Horz | these field types would be used to indicate a horizontal bubble |
| 1-2 | Horz | field of varying height. Each bubble a data mark in the first |
| 1-3 | Horz | bubble in the column would score as a 1, a data mark in the |
| 1-4 | Horz | second bubble in the column would score as a 2, etc, depending upon the number of bubbles in the column, no data marks in any bubble would be scored as a space. |
| 0-1 | Vert | these field types would be used to indicate a vertical bubble field |
| 1-2 | Vert | of varying length. Each bubble a data mark in the first bubble in |
| 1-3 | Vert | the row would score as a 1, a data mark in the second bubble in |
| 1-4 | Vert | the row would score as a 2, etc, depending upon the number of bubbles in the row, no data marks in any bubble would be scored as a space. |
| 0-1 | Vert # | these field types would indicate a vertical bubble field of varying |
| 1-2 | Vert # | length having a must respond option. If no data marks are found |
| 1-3 | Vert # | in any of the bubbles in the field, the field is scored as a "#" and shows up in an Exception Data Listing Report. |

The field type may also be a linked field having two or more vertical or horizontal columns or rows linked together. In general, there are five different types of fields that the user may select from for the field definitions: Numeric—_, 0, 1, 2, 3, 4, etc.; Response—_, 1, 2, 3, 4, etc; Alphanumeric #, A, B, C, D, ... Z, 1, 2, 3, etc.; Numeric Must Respond—#, 0, 1, 2, 3, 4, etc.; and Response Must Respond—#, 1, 2, 3, 4, etc. Other types of of formats may be created by the user as may be required. Once a new field type has been created, the user may specify a name for the field type and that type will be stored in a library and available for use in defining future questionnaires.

Referring to FIGS. 18a–18c again, once the user has designated the field type for the field of response areas currently selected by the cursor, the field is named at Name Field 1132. This entire process is repeated until all of the response areas 54 on the survey form 20 have been defined as indicated at End Fields 1134. Next, the user selects Open Ends 1136 to define the fields for the open-ended questions 56, if any, that might exist on the survey form 20. At Define Open End Questions 1138, the user may enter the characteristics about the open-ended question on the summary of field types that have just been defined and are displayed on the computer screen as shown in FIG. 20. The user moves the cursor in between the field types where the open-ended question data will be stored and hits Enter. This will open a new line for the user to type in information relating to the data record being defined for this page of the questionnaire, including: the starting column of the open-ended question data, the number of columns, the data type (A—alphanumeric, N—numeric, F—key entry field to be inserted after scanning), and the document page number that the question will be found on. It may be desirable to locate most of the open-ended question field at the beginning of the data record to speed the entry of the associated key entry field information to be entered after the survey forms are scanned as described below. The process is repeated until all of the open-ended questions for this page of the questionnaire have been defined. At Print Data File 1140, the user has the option of printing out a hard copy of all of the characteristics and field types that have been defined for the particular questionnaire (the questionnaire data file). With the survey form definition completed, the user is returned to the main menu at Return 1050.

Scan

Figure 21:
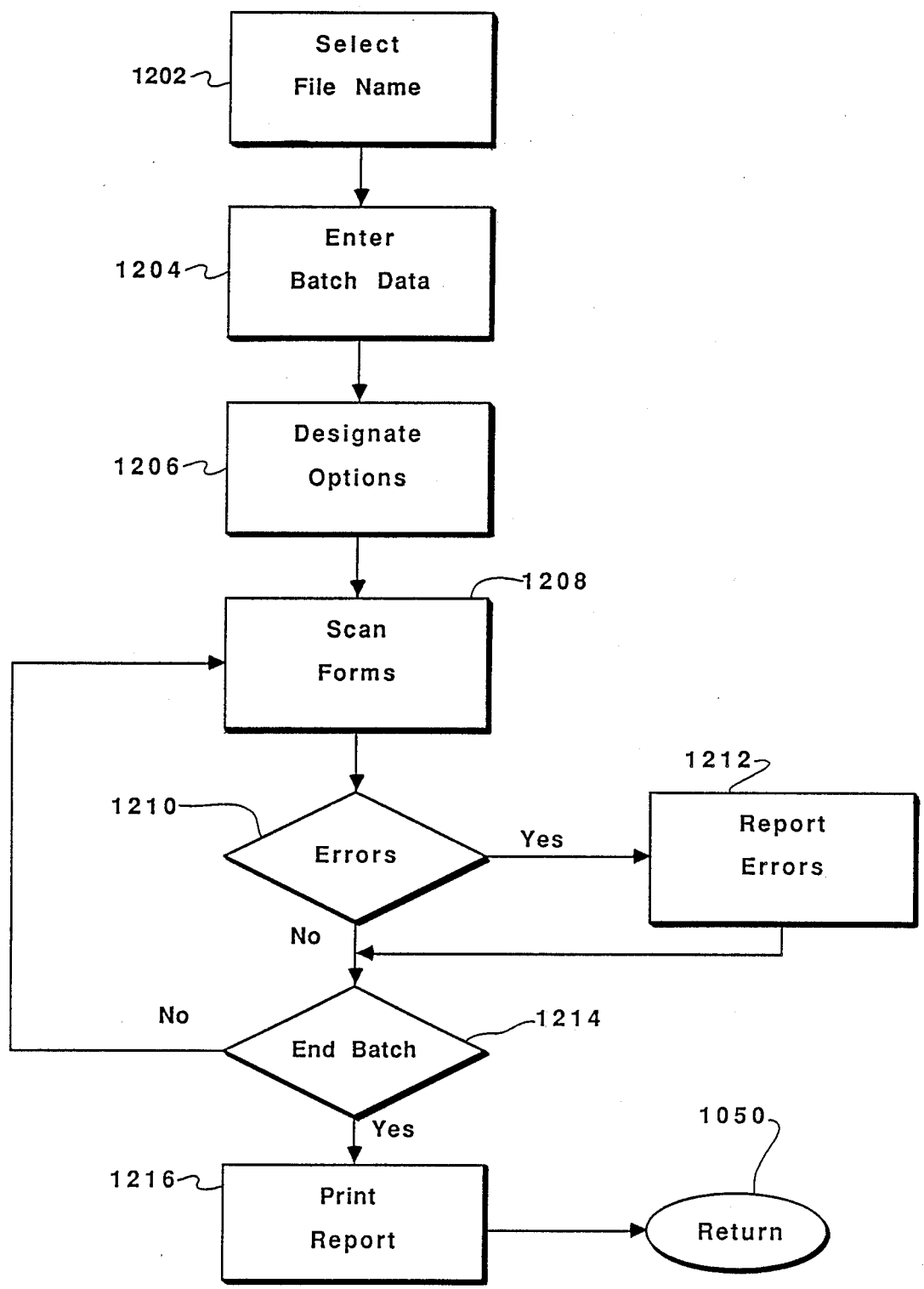
FIG. 21 is a flowchart for the software program associated with the Scan process.

Referring now to FIGS. 21 and 22, the actual scanning operation of the survey forms 20 is described. At Select File Name 1202, the user identifies the questionnaire data file to be scanned. Typically, the survey forms 20 will be returned from being fielded in smaller groups or batches of one hundred to two hundred forms. For quality control reasons, it is desirable to scan the survey forms 20 in these smaller batches. At Enter Batch Data 1204, the user enters the data file name that is the name of the file where the scanned data will be stored. The scanned data may also be appended to an existing data file or may replace an existing data file, if, for example, an entire batch of survey forms are rescanned. Next, the user enters the batch number that identifies the particular batch of survey forms being scanned. If the scanner 16 is equipped with a transport printer, the scanner 16 can print this 4-digit number on each of the survey forms 20 as they are being scanned. Next, the user enters a starting serial number to generate an individual serial number that will be assigned to each of the survey forms as they are scanned. Again, if the scanner 16 is equipped with a transport printer, each survey form can have the individual serial number printed on the survey forms 20 as they are scanned. The user is also allowed to enter an eight character constant value that will be placed in the questionnaire data file record and, if a transport printer is available, will be printed on each of the survey forms. It is a good idea to designate this constant as the same name as the data file previously assigned. Next, the user may designate several options that are used to control the scanning of the survey forms at Designate Options 1206. The various options include: Field Error, QA Error, Transport Printer, and Scan Report. The Field Error option allows the user to decide whether to have the scanner 16 pause if it detect a field with incorrect input, i.e. a must respond field that has no response, or whether the record will be flagged for later correction. The QA Error option allows the user to decide to have the scanner 16 pause if it detects a survey form 20 that did not pass the quality assurance alignment test described above, or the user may have the record flagged for later correction. The Transport Printer option allows the user designate whether the scanner 16 is equipped with a transport printer and whether the transport printer will be used to mark the batch number, sequence number, etc. on the survey forms 20 as they are scanned. The Scan Report option allows the user to elect to have the computer 18 produce a one page report to a peripheral printer attached to the computer 18 for each of the batches as they are scanned. The report lists the questionnaire name, data file name, number of questionaires scanned, and the data.

The actual scanning of the forms occurs at Scan Forms 1208. If the questionnaire is comprised of multiple pages, the page order should be determined by the particular scanner 16 being used with the system 10. In a preferred embodiment, the NCS Sentry 3000 scanner has a top down page order (page 3 on the bottom, page 2 next, and page 1 on the top), but the pages come out in reverse order after they are scanned (page 1 on the bottom, page 2 next, and page 3 on the top). It is a good idea to restaple multiple page surveys together after they have been scanned to insure that the survey forms remain in the scanned sequence.

At Report Errors 1210, the computer 18 checks for and displays a running tally of the results of the scanning operation as it is occurring in a format similar to that shown in FIG. 23. Any error messages are displayed in the Error Message Field 1250. Some of the typical error messages that might occur include:

Unexpected form identification mark—if the survey form 20 that was scanned did not have a form identification mark 70 that was identical to the form identificatioin mark 70 on the form key 68 for this questionnaire, an error condition will occur. This error may occur if the form identification mark 70 was printed on only one page of a multiple page questionnaire. If so, the user must rescan the entire questionnaire booklet because no data will be saved from a partially scanned questionnaire booklet.

Incorrect Number of Timing Marks Read—if the scanner 16 did not read the expected number of timing marks 26, an error condition will occur. The user should check the form for stray marks in the timing track 24.

Field with a Multiple Response—if a field has been defined to not allow multiple responses (*) and multiple data marks are detected for that field, an error condition will occur.

Field with No Response—if a field has been defined to require a response (#) and no data marks are detected for that field, an error condition will occur.

All of the survey forms 20 in this batch are scanned until End Batch 1214. If the Scan Report Option was selected by the user, a scan report for the batch is printed out at Print Scan Report 1216.

Key Enter

In general, there are two ways of entering data from the open-ended questions 56 that appear on a survey form 20. First, the data may be pre-coded into specially designated response area positions located on the survey form 20, as shown for example in FIG. 24a. An alternative approach to precoding uses a second survey form 20 that is comprised of a number of response areas fields for coding the information in response to corresponding open-ended questions 56 in a questionnaire booklet. To scan this information, these response areas are defined as special fields during the Define 1100 step. When the survey forms 20 are returned from the field, the user fills in the appropriate code in the special field and the survey forms are now ready to be scanned with the information from the open-ended questions 56 being collected in the special fields.

Another method for encoding information contained in the open-ended questions 56 occurs after the survey forms 20 have been scanned and the data file record for each survey form has been created and saved in the data file. In a preferred embodiment, the user selects the questionnaire and data file for which the information is to be included, and then enters the data directly into the individuals data file records using the preferred statistical package, StatPac Gold. It should be obvious that any number of data entry methods may be used to enter either coded or alphanumeric data directly into the data file records once they have been scanned in the system 10 by the scanner 16.

Data File Management

Figure 25:
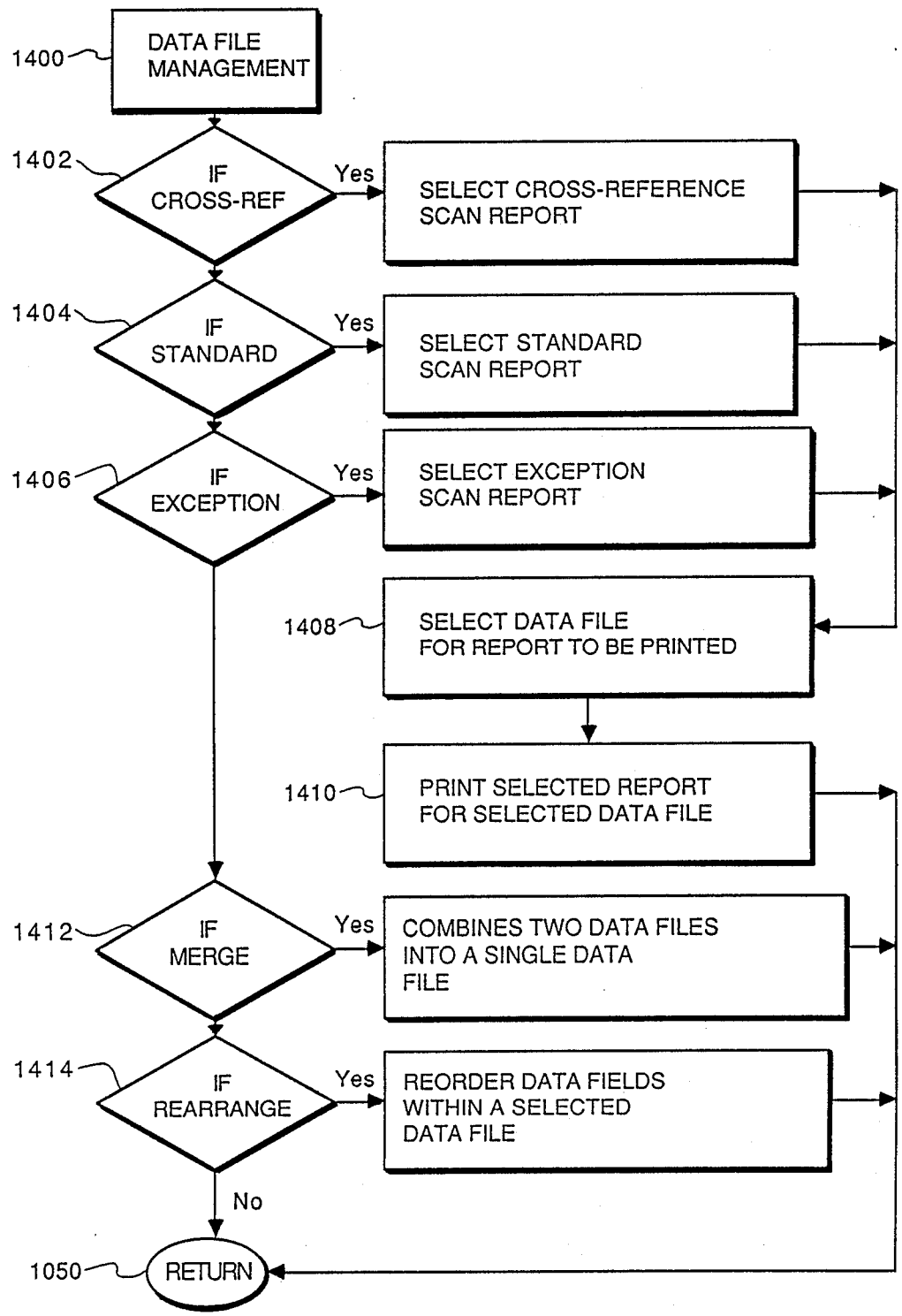
FIG. 25 is a flowchart for the software program associated with the Data File Management process.
Figure 26:
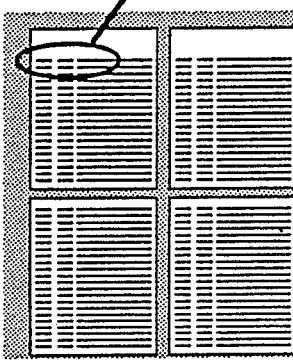
FIG. 26 is a depiction of a sample standard report generated after all of the survey forms have been scanned by the present invention.

Referring now to FIG. 25, the routine that handles the data file management will be explained. At Print Cross-Reference 1402, the user may elect to print a report of the data file to be selected with the form identification number cross referenced with the file record number. At Print Standard 1404, the use may elect to print the standard report containing all of the data in the data file by file record number. An example of a sample standard report is shown in FIG. 26. At Print Exception 1406, the user may elect to list all of the data file records containing any type of field error. For each of these three options, the user identifies the desired data file at Select File 1408 and the selected report is printed out on a peripheral printer attached to the computer 18 at Print Report 1410. The user also has the option of manipulating the data in existing data files. At Merge Data 1412, the user may combine two different data files into a single data file. At Rearrange Data 1414, the user may reorder the data fields in a selected data file. After the desired event has been processed, control is returned to the main screen at Return 1050.

Statistical Analysis

In a preferred embodiment, the computer 18 transfer control to a statistical software package StatPac Gold, available from Walonick Associates, Minneapolis, Minn. Using this or any similar software package, the user may perform any number of statistical calculations on one or more of the data files created by the desktop survey system 10. For example, the user might first elect to edit the data to clean up any of the data field error identified in the Exception Report. After the data was cleaned up, frequency, standard deviation, distribution and other statistical information can be calculated. The results can be displayed in a variety of methods, including reports, bar charts, graphs, pie charts, distribution plots or a customized graphic display.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A desktop survey system for creating a survey form to be completed by a survey respondent and for scanning the survey form after it has been completed by the respondent, the survey form being printed on a scannable form having a preprinted timing track that can be scanned by an optical mark scanner, the desktop survey system comprising:

computer means for creating the survey form comprising:

means for entering one or more questions to be printed on the scannable form;

means for entering one or more response areas corresponding to each question, the response areas comprising an outline in which the survey respondent may make a data mark indicating that that response area was selected by the survey respondent; and means for positioning the response areas on the survey form such that the response areas will be accurately positioned in a specified relation to the timing track when the response areas are printed on the scannable form;

printing means for printing the survey form such that the questions and the corresponding response areas are overprinted on the scannable form in response to the means for positioning the response areas;

means for communicating the positions of the response areas as positioned on the scannable form by the means for positioning the response areas; and scanning means for scanning the survey form after the survey respondent has indicated which response areas were selected by the survey respondent by using a handheld marking instrument, including means for determining the location of the response areas on the survey form in response to the means for communicating the positions of the response areas.

2. The desktop survey system of claim 1 wherein the computer means further comprises means for generating a unique form identification code based upon the positions occupied by the response areas on the survey form.

3. The desktop survey system of claim 1 wherein the means for positioning the response areas comprises a grid of dots displayed on a terminal display, each dot representing the center of a possible for the response area such that when the response area is centered about the dot the response area will be positioned in a specified relationship with the timing track when the survey form is printed.

4. The desktop survey system of claim 1 wherein the means for communicating positions of the response areas is comprised of a form key having only the response areas printed on the scannable form, each response area being filled in to represent a data mark scannable by the scanning means.

5. The desktop survey system of claim 1 wherein the means for communicating positions of the response areas is comprised of a computer data file having the horizontal and vertical offset positions in relation to the timing track for each of the response areas.

6. A desktop survey system for creating a survey form to be completed by a survey respondent and for scanning the survey form after it has been completed by the respondent, the survey form being printed on a scannable form having a preprinted timing track comprised of a column of timing marks that can be scanned by an optical mark scanner, the desktop survey system comprising:

input means for entering stimulus data specifying one or more stimulus items to be printed on the scannable form and configuration data specifying a configuration of one or more response areas associated with the stimulus items, each response area comprising an outline in which a survey respondent may make a data mark using a handheld marking instrument indicating that response area was selected by the survey respondent;

data processing means for receiving the stimulus data and the configuration data from the input means and developing locational information that accurately specifies where the stimulus items and the associated response areas will be located on the scannable form in a specified relation to the timing marks on the scannable form;

storage means for storing the configuration data together with the locational information;

printer means operably connected with the processing means for printing one or more survey forms in response to the stimulus data, the configuration data and the locational information; and scanning means communicating with the storage means for receiving the configuration data together with the locational information and for scanning the survey forms completed by the survey respondents in accordance with the configuration data together with the locational information to interpret the completed survey forms by determining the presence or absence of data marks in the response areas.

7. A system for creating a survey form to be printed on a scannable form having a preprinted timing track, including at least one preprinted timing mark, the system comprising:

means for entering one or more stimulus items to be printed on the scannable form;

means for entering a plurality of response areas to be printed on the scannable form, one or more of the response areas corresponding to each stimulus item;

means for positioning the response areas such that the response areas are accurately positioned in a specified relation to the timing track;

means for generating a form identification code based upon the positions occupied by the response areas; and printing means for printing the survey form such that the response areas are printed on the scannable form in response to the means for positioning the response areas and the form identification code is printed on the scannable form to identify a unique combination of positions of the response areas on the survey form.

8. The desktop survey system of claim 7 wherein the means for positioning the response areas comprises a grid of dots displayed on a terminal display, each dot representing the center of a possible position for the response area such that when the response area is centered about the dot the response area would occupy a specified relationship with the timing track when the survey form is printed.

9. A method for creating a survey form to be printed on a scannable form having a preprinted timing track by using a computer to design the survey form, the method comprising the steps of:

entering into the computer at least one stimulus item to be subsequently printed on the scannable form;

entering into the computer a plurality of response areas to be subsequently printed on the scannable form, one or more of the response areas corresponding to the stimulus item;

positioning the response areas such that the response areas are accurately positioned by the computer in a specified relation to the timing track;

generating a form identification code with the computer based upon the positions occupied by the response areas; and printing the survey form such that the response areas are printed on the scannable form in a specified relation to the timing track and the form identification code is printed on the scannable form to identify a unique combination of positions of the response areas on the survey form.

10. A method for creating and scanning a customized survey form to be designed on a computer and printed on a scannable form having a preprinted timing track that can be scanned by an optical mark scanner, comprising the steps of:

entering stimulus data into the computer corresponding to one or more stimulus item to be subsequently printed on the scannable form;

entering configuration data into the computer corresponding to a plurality of response areas to be subsequently printed on the scannable form corresponding to each stimulus item;

positioning the data for the response areas such that the response areas are accurately positioned by the computer in a specified relation to the timing track;

printing a form key having all of the positions indicated by the configuration data represented by a series of marks that will be scanned by the optical mark scanner;

scanning the form key using the optical mark scanner to identify all of the positions of the response areas on the survey form;

printing the survey forms with the data corresponding to the stimulus items and the data corresponding to the response areas such that the response areas will be an outline in which a survey respondent may make a data mark using a handheld marking instrument that indicates that the response was selected by the survey respondent; and scanning the survey forms after they are fielded to a group of respondents such that the optical mark scanner will determine the presence or absence of the data marks in accordance with the pattern for the positions of the response areas as communicated by the form key.

11. The method of claim 10 further comprising the steps of:

automatically generating a unique form identification code using the computer based upon the combination of positions of the response areas;

printing the identification code on the form key;

printing the identification code on the survey form; and verifying the identification code on the survey form with the identification code on the form key to insure that the survey form corresponds with the form key.

12. A method for creating a unique form identification code for a customized survey form to be designed on a computer and scanned by an optical mark scanner, comprising the steps of:

entering configuration data into the computer corresponding to a plurality of response areas to be subsequently printed on the scannable form corresponding to the stimulus item;

positioning the data for the response areas such that the response areas are positioned by the computer in a specified relation to a plurality of predefined timing marks that comprise a timing track for the survey form;

automatically generating a unique form identification code based upon the combination of positions of the response areas as positioned by the computer; and printing the identification code on the survey form.

13. The method of claim 10 further comprising the steps of:

printing the identification code on a form key to be scanned along with the survey form;

scanning the form key and the survey form using an optical mark scanner; and verifying the identification code on the survey form with the identification code on the form key to insure that the survey form corresponds with the form key.

* * * * *

UNITED STATES PATENT AND TRADEMARK OFFICE
CERTIFICATE OF CORRECTION

PATENT NO. : 4,937,439

DATED : June 26, 1990

INVENTOR(S) : Lester A. Wanninger et al.

It is certified that error appears in the above-identified patent and that said Letters Patent is hereby corrected as shown below:

Column 5, line 30, delete "displays" and insert -- display --

Column 6, line 37, delete "survey", 2nd occurrence

Column 7, line 43, delete "forms" and insert -- form is --

Column 8, line 34, delete "set" and insert -- sets --

Column 9, line 21, delete "show" and insert -- shows --

Column 9, line 37, delete "set" and insert -- sets --

Column 10, line 63, delete "on" and insert -- one --

Column 12, line 61, delete "flow chart" and insert -- flowchart"

Column 19, line 6, delete "groups" and insert -- group --

Column 19, line 33, delete "etc" and insert -- etc. --

Column 21, line 6, delete "detect" and insert -- detects --

UNITED STATES PATENT AND TRADEMARK OFFICE
CERTIFICATE OF CORRECTION

PATENT NO. : 4,937,439

DATED : June 26, 1990

INVENTOR(S) : Lester A. Wanninger et al.

It is certified that error appears in the above-identified patent and that said Letters Patent is hereby corrected as shown below:

Column 21, line 13, after "user" insert -- to --

Column 22, line 39, delete "use" and insert -- user --.

Column 1, line 18, after "scannable" insert -- forms --

Column 3, line 62, delete "fileto" and insert -- file to --

Column 4, line 31, delete "costeffective" and insert -- cost effective --

Column 8, line 17, delete "form" and insert -- from --

Column 9, line 19, delete "test" and insert -- text --

Column 10, line 47, after "on" insert -- to --

Column 18, line 35, delete "data" and insert -- date --

Column 21, line 22, delete "questionaires" and insert -- questionnaires --

Column 21, line 45, delete "informatioin" and insert -- information --

UNITED STATES PATENT AND TRADEMARK OFFICE
CERTIFICATE OF CORRECTION

PATENT NO. : 4,937,439

DATED : June 26, 1990

INVENTOR(S) : Lester A. Wanninger et al.

It is certified that error appears in the above-identified patent and that said Letters Patent is hereby corrected as shown below:

Column 23, line 62, after "communicating" insert -- the --

Column 23, line 68, after "communicating" insert -- the --

Signed and Sealed this

Second Day of June, 1992

Attest:

DOUGLAS B. COMER

*Attesting Officer*    *Acting Commissioner of Patents and Trademarks*